(12) United States Patent
Almadi et al.

(10) Patent No.: US 8,312,320 B2
(45) Date of Patent: Nov. 13, 2012

(54) INTELLIGENT FIELD OIL AND GAS FIELD DATA ACQUISITION, DELIVERY, CONTROL, AND RETENTION BASED APPARATUS, PROGRAM PRODUCT AND RELATED METHODS

(75) Inventors: Soloman M. Almadi, Dhahran (SA); Abdullah Al-Khalifah, Dhahran (SA); Tofig A. Al-Dhubaib, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 742 days.

(21) Appl. No.: 12/547,295

(22) Filed: Aug. 25, 2009

(65) Prior Publication Data

US 2010/0050017 A1  Feb. 25, 2010

Related U.S. Application Data

(60) Provisional application No. 61/091,681, filed on Aug. 25, 2008.

(51) Int. Cl.
  *G06F 11/00* (2006.01)
(52) U.S. Cl. ............... 714/15; 714/45; 340/853.2
(58) Field of Classification Search ............ 714/15, 714/45; 702/130, 138, 140; 166/250.01; 340/853.1, 853.2, 853.9, 854.7, 854.9, 855.3, 340/855.4, 855.5, 856.3
  See application file for complete search history.

(56) References Cited

U.S. PATENT DOCUMENTS

| | | | |
|---|---|---|---|
| 3,629,859 A | 12/1971 | Copland | |
| 3,921,152 A | 11/1975 | Hagar | |
| 4,216,536 A | 8/1980 | More | |
| 4,736,204 A | 4/1988 | Davison | |
| 4,839,644 A | 6/1989 | Safinya | |
| 4,852,070 A | 7/1989 | Stuart-Bruges | |
| 4,897,646 A * | 1/1990 | Goodwill et al. | 340/853.9 |
| 5,331,318 A | 7/1994 | Montgomery | |
| 5,581,024 A * | 12/1996 | Meyer et al. | 73/152.03 |
| 5,774,420 A * | 6/1998 | Heysse et al. | 367/83 |
| 5,881,310 A | 3/1999 | Airhart | |
| 6,252,518 B1 * | 6/2001 | Laborde | 340/855.4 |

(Continued)

OTHER PUBLICATIONS

Vo, L., "An Assessment of Emerging Technologies for Production Optimization in Saudi Aramco—Southern Area Production Engineering," Society of Petroleum Engineers, Inc. 2005, also presented at 14th SPE Middle East Oil & Gas Show and Conference, Bahrain International Exhibition Centre Bahrain, Mar. 12-15, 2005.

(Continued)

*Primary Examiner* — Joshua Lohn
(74) *Attorney, Agent, or Firm* — Bracewell & Giuliani LLP

(57) ABSTRACT

An apparatus, program product, and methods for data management, are provided. An exemplary apparatus includes one or more PDHMS surface units each having a serial interface to provide a continuous real-time data stream of captured data, a data storage medium for storing collected downhole process data during a downstream communication link failure, a controller configured to cause the PDHMS surface unit to store recovery data during the downstream communication failure, and a broadband interface to provide recovery file transmission of recovery data stored during the downstream communication link failure. The apparatus can also include a RTU configured to collect the continuous real-time data collected by the PDHMS surface unit and to transmit the collected data to a SCADA system, which can function as a time synchronization master for the RTU and PDHMS surface units, and which can forward the collected data to other systems.

40 Claims, 11 Drawing Sheets

U.S. PATENT DOCUMENTS

| | | | |
|---|---|---|---|
| 6,630,890 B1 * | 10/2003 | Endo et al. | 340/853.9 |
| 6,816,082 B1 * | 11/2004 | Laborde | 340/853.3 |
| 6,885,308 B2 | 4/2005 | Smith | |
| 6,937,159 B2 | 8/2005 | Hill | |
| 6,963,290 B2 | 11/2005 | Marsh | |
| 7,096,092 B1 | 8/2006 | Ramakrishnan | |
| 7,145,472 B2 * | 12/2006 | Lilly et al. | 340/853.3 |
| 7,167,101 B2 * | 1/2007 | Golla et al. | 340/853.1 |
| 7,230,541 B2 | 6/2007 | Ripolone | |
| 7,261,162 B2 | 8/2007 | Deans | |
| 7,394,064 B2 | 7/2008 | Marsh | |
| 7,546,489 B2 * | 6/2009 | Gittins et al. | 714/39 |
| 7,777,643 B2 * | 8/2010 | Sun et al. | 340/853.9 |
| 2007/0201362 A1 | 8/2007 | Johnson | |
| 2009/0140879 A1 * | 6/2009 | Kamata et al. | 340/853.2 |
| 2009/0173493 A1 * | 7/2009 | Hutin et al. | 166/250.01 |

OTHER PUBLICATIONS

The Rovisys Company, "RoviSys Pidder Server for OSI PI Historian," Copyright 1998-2001.

Weatherford International, Ltd, "ePRO Sensor Data Process System," 2007.

Lios Technology, "Superior Technology and Industrial Strength," found at www.thermal-rating.com/Menu/Technology/Superior+Technology+and+Industrial, pp. 1-4, printed Aug. 25, 2009.

Wellwatcher tool, "Permanent Monitoring Systems watch your well with the WellWatcher tool," Middle East Well Evaluation Review, Nov. 19, 1997.

The International Search Report and the Written Opinion for PCT/US2009/054895 Dated Aug. 25, 2009 (Dec. 23, 2009).

Al Dhubaib T.A., Almadi S.M., Shenqiti M.S., Mansour A.M.: "I-Field Data Acquisition and Delivery Infrastructure: Case Study"; Society of Petroleum Engineers, SPE, Dated Feb. 25, 2008, Amsterdam, NL.

Al-Arnaout H I et al: "Production Engineering Experience With the First I-Field Implementation in Saudi Aramco at Haradh-III: Transforming vision to Realty"; Society of Petroleum Engineers, SPE, Dated Feb. 25, 2008, Amsterdam, NL.

Al-Arnaout H I et al: "Intelligent Wells to Intelligent Fields: Remotely Operated Smart Well Completions in Haradh-III"; Society of Petroleum Engineers, SPE, Dated Feb. 27, 2008, Amsterdam, NL.

Williams J.B.: "Computer Production Control Development in North Midway-Sunset"; Society of Petroleum Engineers, SPE 4172, Dated Nov. 8, 1972, Bakersfield, CA.

* cited by examiner

INTELLIGENT FIELD OIL AND GAS FIELD DATA ACQUISITION, DELIVERY, CONTROL, AND RETENTION BASED APPARATUS, PROGRAM PRODUCT AND RELATED METHODS

RELATED APPLICATIONS

This application is a non-provisional of and claims priority to and the benefit of U.S. Provisional Patent Application No. 61/091,681, filed Aug. 25, 2008, incorporated herein by reference in its entirety.

BACKGROUND OF THE INVENTION

1. Field of the Invention

The present invention relates generally to the oil and gas industry, particularly reservoir management, and more particularly to apparatus, program product, and methods for acquiring, delivering, controlling, and retaining permanent downhole monitoring system data.

2. Description of Related Art

Advances in technology continue to have a great impact on the petroleum industry. Within the past 20 years, many technologies have transformed the way oil and gas companies manage and/or optimize their operations. One such technology includes permanent downhole monitoring systems (PDHMS), which were introduced over 20 years ago. Early installations included self-contained pressure/temperature gauge module, which had to be retrieved in order to recover data. Some more conventional configurations include wire or fiber-optic connection, which communicate the data to surface units. Others include a network topography which provides such data between downhole sensors and the surface units. Initial methodologies of transferring the data received at the surface to a central computer or monitoring station included use of physical transport and/or transmission over land-based wire lines. A PDHMS surface unit typically is used to collect subsurface sensor performance data, i.e., pressure and temperature gauges. The connection between the surface unit and the subsurface gauges is typically a vendor propriety solution. Connection from the PDHMS surface unit to the host (RTU/SCADA), however, is typically via either standard RS232 or RS485 interfaces.

More recent technologies include utilization of radiowave well data monitoring which can include individual well transmitters that transmit to a remote terminal unit (RTU) that sends the data by UHF radio to an information server or SCADA system, which can then migrate the data over a local communication network to desktops of production engineers. Similar technologies include utilization of global satellite mobile or cellular telephone based communication, which have generally been employed as a backup to provide alerts. Such technologies of remote monitoring of field data can provide wellhead pressure, annuli pressures, etc., both in real-time and on demand, to allow centralized well control.

In order to provide sufficient data to properly monitor and control each well, it is desirable that the PDHMS surface units be capable of collecting subsurface sensor data at short intervals. Recognized by the inventors is that significantly enhanced monitoring and control of can be had by acquiring sensor data, for example, at one second intervals. Conventional PDHMS surface units, however, generally have limited storage capacity and only a single serial interface (e.g., RS-232 serial port). As such, problems encountered with conventional PDHMS surface units include the limited storage capacity resulting in vital reservoir performance data loss, and the limited bandwidth provided by the serial interface resulting in an inability to transmit large data files representing stored data while simultaneously continuing to transmit currently collected data. Additionally, conventional PDHMS surface units generally do not have an effective time synchronization capability with the host computer in order to properly identify stored data stored by such conventional PDHMS surface units. As such, existing systems would or do not tolerate either failure of the host computer/SCADA server/RTU or failure of the network between the host computer/SCADA server and the PDHMS surface units when operating at a high dataflow rate, and thus, do not support such enhanced monitoring and control scheme recognized as extremely advantageous by the inventors.

Specifically, due to such limited storage capacity, limited transmission bandwidth, and lack of time synchronization capability with the host, which can cause insurmountable data conflicts between captured data and the host data that is used for simulation and reservoir optimization, data collected during a communications outage typically must either be discarded out right, or would be discarded by the host system. As such, it has been recognized by the inventors that existing systems do not adequately tolerate network or host failure, and that a network failure or a host failure results in loss of the collected data during the outage period. Additionally, it has been recognized that data lost during the outage or during a PDHMS system capacity/storage capacity overload condition can not be regenerated by conventional systems. Further, it has been recognized by the inventors that even if conventional PDHMS systems were made to have the ability to recover such extensive collected data, such systems could not place such recovered data in the proper sequential order with respect to the data received prior to and after the outage, making the recovered data virtually useless.

Recognized, therefore, by the inventors is the need for an apparatus/system, program product, and methods which provide a PDHMS system having sufficient storage capacity to store downhole process data collected during a downstream communication interruption, an apparatus/system capable of regenerating collected data that is "lost" during an outage or during a capacity overload condition, a PDHMS system which has sufficient bandwidth to allow large recovery file transmissions that do not disrupt real-time data acquisition and transmission of current data, and a PDHMS system which has time synchronization capabilities with the host system to allow for recovering missing data into the proper sequential order.

SUMMARY OF THE INVENTION

In view of the foregoing, various embodiments of the present invention advantageously provide apparatus and methods for managing data which provide field system data retention through the addition of sufficient storage capacity to thereby store downhole process data collected during a downstream communication interruption, and through the retention of data upon a communication link failure, host failure, or both components, or any other form of downstream communication interruption/failure. Various embodiments of the present invention also advantageously provide apparatus, program product, and methods for managing data which includes a Permanent Downhole Monitoring System (PDHMS) capable of regenerating collected data that is "lost" during an outage or during a capacity overload condition, which has sufficient bandwidth to allow large recovery file transmissions, and which provides field system data retention through data synchronization between the host, subsystems, and the upper application layers to allow for recovering missing data, in the proper sequence. Various embodiments of the present invention also advantageously provide PDHMS surface units which can continuously gather and store pressure and temperature readings, regardless of whether or not there is a downstream communication interruption (between the PDHMS surface unit and end-user).

Specifically, according to an example of an embodiment of the present invention, an apparatus to manage post-drilling operation data acquisition can include at least one, but preferably a plurality of PDHMS surface units each having a serial interface to provide a continuous real-time data stream of captured downhole process data points, a volatile data storage medium to temporarily store each captured data point, a non-volatile data storage medium for storing collected downhole process data (recovery data) during a downstream communication link failure downstream of the respective PDHMS, a broadband interface to provide for recovery file transmission of the recovery data stored in one or more recovery files during the downstream communication link failure, a controller configured to recognize or otherwise detect the downstream communication link failure, to cause the respective PDHMS surface unit to store the recovery data into nonvolatile storage medium in one or more recovery files during the downstream communication failure if not already continuously being accomplished, and responsive to downstream communication link reestablishment, to provide substantially simultaneously both the continuous real-time data stream of captured data over the serial interface and at least portions of the stored process data in the one or more recovery files over the broadband interface to thereby non-disruptively provide recovery file transmission of recovery data stored during the downstream communication link failure.

The apparatus can also include at least one receiver transmitter unit (RTU) in communication with the serial interface of each of the plurality of PDHMS surface units. The RTU includes a controller configured to collect the continuous real-time data collected by each of the plurality of PDHMS surface units, to detect a downstream communication link failure downstream of the RTU, to communicate with each of the plurality of PDHMS surface units to cause the PDHMS surface units to store recovery data during the downstream communication link failure, and to detect an existence of a communication failure in a RTU-PDHMS surface unit communication link between one of the plurality of PDHMS surface units and the RTU (RTU-PDHMS surface unit communication link failure) when so occurring, to determine a time of failure of the RTU-PDHMS surface unit communication link, to report the RTU-PDHMS surface unit communication link failure, to determine a time of restoration of the failed RTU-PDHMS surface unit communication link (RTU-PDHMS surface unit communication link restoration), and to determine or otherwise identify which of one or more recovery files in each PDHMS surface unit contain captured downhole process data points captured and stored during the communication failure but not delivered or otherwise reported.

The apparatus can further include network interface and a supervisory control and data acquisition (SCADA) system including a SCADA host server in communication with the broadband interface of each of the plurality of PDHMS surface units and in communication with the RTU via the network interface and including a controller configured to monitor communications between each of the PDHMS surface units and associated RTU and between the RTU and the SCADA system (upstream communication links), to determine an existence of a communication failure in one of the upstream communication links when so occurring, to determine a time of failure of the failed upstream communication link, to determine a time of restoration of the failed upstream communication link responsive to restoration of communications over the failed upstream communication link, and upon restoration of communications over the failed upstream communication link, to capture real-time process data including the process data captured real-time by each of the plurality of the PDHMS surface units, to retrieve process data relating to the recovery data previously captured and stored by one or more of the PDHMS surface units and not delivered due to the communication failure of the respective failed upstream communication link, and in a preferred configuration, to create a single new file containing the recovered data for transfer over a downstream communication link downstream of the SCADA host server.

According to another example of an embodiment of the present invention, an apparatus to manage post-drilling operation data acquisition can include a PDHMS surface unit having a serial interface and a broadband interface to selectively provide a continuous real-time data stream of downhole process data and to provide for recovery file transmission of recovery data stored in one or more recovery files during a downstream communication failure downstream of the PDHMS surface unit. The downhole process data can include a plurality of captured downhole process data points each including a plurality of real-time pressure and temperature pairs captured substantially simultaneously via a plurality of separate and spaced apart downhole sensors. The PDHMS surface unit can also include a first data storage medium to temporarily store each captured data point, a second data storage medium to store each captured data point collected during the downstream communication failure located downstream of the PDHMS surface unit defining recovery data, and a controller configured to detect the downstream communication failure when occurring (e.g., RTU with or PDHMS-RTU communication medium or link failure) and to cause the respective PDHMS surface unit to store the recovery data in the second PDHMS storage medium in one or more recovery files during the downstream communication failure downstream of the PDHMS surface unit.

The apparatus can also include a receiver transmitter unit (RTU) in communication with the serial interface of the PDHMS surface unit and having a controller configured to collect the continuous real-time data collected by the PDHMS surface unit, configured to detect an existence of a communication failure between the PDHMS surface unit and the RTU (RTU-PDHMS surface unit communication failure) when so occurring, to detect a downstream communication failure downstream of the RTU (e.g., SCADA host or network failure), and to trigger the PDHMS surface unit to archive the process data locally and within the PDHMS unit responsive to detect in the downstream communication failure.

Various embodiments of the present invention also include methods for managing post-drilling operation data acquisition. A method according to an example of an embodiment of the present invention includes the step of providing an apparatus to manage post-drilling operation data acquisition including a PDHMS surface unit having a serial interface and a broadband interface, an associated RTU in communication with the serial interface of the PDHMS surface unit, a network interface including an Ethernet switch, and a SCADA system host server in communication with the broadband interface of the PDHMS surface unit and the RTU via the network interface. The method can also include the steps of receiving by the PDHMS surface unit, a substantially continuous stream of real-time process data including real-time pressure and temperature from a plurality of separate and spaced apart downhole pressure sensors associated therewith according to a preselected e.g., one second interval, and responsive to receiving the real-time process data, providing a continuous real-time data stream of captured downhole process data including a plurality of captured downhole process data points each comprising a plurality of real-time pressure and temperature pairs captured substantially simultaneously (e.g., that one second intervals) via the plurality of separate and spaced apart downhole sensors. The method can further include the steps of detecting a downstream communication failure, when occurring, between the PDHMS surface unit and the associated RTU and/or between the RTU and the SCADA system host server (individually and collectively defining a downstream communication pathway failure located downstream of the PDHMS surface unit) when occurring, and responsive to the downstream communication pathway failure located downstream of the PDHMS surface unit, the PDHMS surface unit storing the received real-time process data in one or more recovery files to define recovery data.

The method can also include, responsive to downstream communication pathway reestablishment, the PDHMS surface unit substantially simultaneously providing both the continuous real-time data stream of captured data over the serial interface and at least portions of the recovery data stored in the one or more recovery files over the broadband interface to thereby non-disruptively provide recovery file communication (provision) of the recovery data stored during the downstream communication pathway failure downstream of the PDHMS surface unit. The provision of the one or more recovery files can include providing copy access to one of the one or more recovery files when simultaneously performing recovery file update thereof with additional captured process data points without a file access violation during copy access by either the RTU, the SCADA host server, and an intermediate host server in communication SCADA host server, to thereby prevent disruption of the post-communication pathway reestablishment provision of the continuous real-time data stream of captured data.

The method can further include monitoring a health status of a RTU-PDHMS surface unit communication pathway, detecting a failure of the RTU-PDHMS surface unit communication pathway when occurring, determining a time and date when the failure of the one of the RTU-PDHMS surface unit communication pathway occurred, directly or indirectly reporting the failure of the RTU-PDHMS surface unit communication pathway when occurring to the SCADA host server, detecting a restoration of the failed RTU-PDHMS surface unit communication pathway when occurring, determining a time and date when the restoration of the failed RTU-PDHMS surface unit communication pathway occurred, and identifying which of one or more recovery files of a plurality of recovery files stored by the PDHMS surface unit contain captured downhole process data points captured and stored during the failure of the RTU-PDHMS surface unit communication pathway and not delivered to the RTU due to the failure thereof. According to a preferred configuration, the one or more recovery files are be identified by the RTU responsive to the RTU determining the one or more recovery files to contain one or more captured downhole process data points having a timestamp falling within a time continuum extending between the time of failure of the RTU-PDHMS surface unit communication pathway and the time of restoration thereof.

The method can still further include, in a preferred configuration, the SCADA host server or agent host server thereof issuing an FTP command to copy the one or more recovery files containing the recovery data previously captured by the respective PDHMS surface unit associated with the failed RTU-PDHMS surface unit communication pathway and not delivered due to the failure thereof, and extracting process data and timestamp data from the copied one or more recovery files characterized by having a timestamp falling within a continuum beginning at the time of failure of the RTU-PDHMS surface unit communication pathway and ending at the time of restoration thereof.

The method can additionally include the SCADA host server determining an existence of a communication failure in one of the plurality of upstream communication pathways when so occurring, determining a time of failure of the failed upstream communication pathway, and responsive to restoration of communications over the failed upstream communication pathway, determining a time of restoration of a failed upstream communication pathway, initiating copying of each of one or more recovery files each containing at least a portion of the recovery data previously captured and stored by one of the PDHMS surface unit and not delivered due to loss of communications over the failed upstream communication pathway defining recovered data, refetching the recovered data into a SCADA historian, and creating a, e.g., single, new file containing the recovered data for transfer over a downstream communication pathway downstream of the SCADA host server.

Various embodiments of the present invention also include program product distributed across the PDHMS surface units, RTUs, and SCADA host server and/or intermediate host server in communication with the SCADA host server, to manage post-drilling operation data acquisition, which can perform the method steps described above.

Various embodiments of the present invention introduce high performance functionality, methodology and mechanism to capture oil and gas well performance data and to deliver it to a centralized data acquisition system. Various embodiments of the present invention can provide a mechanism that can sustain different type of possible failures, including communication and host equipment failures. Various embodiments of the present invention provide a solution to retrieve process data generated and stored in the PDHMS surface unit, for example, as a text file format, in a storage medium that can be built in as integrated part of the PDHMS system surface unit.

According to various embodiments of the present invention, the solution can be based on the introduced capability of storing/logging scanned data in the PDHMS unit as a Comma Separated Values (CSV) file or other compatible format in a high volume data storage medium for extended periods of time while making real-time data available to be pulled by a host system during normal operation. In the event of data flow interruption, data logged in the CVS file can be transferred to other components to fill in the missing data. Various embodiments of the present invention can advantageously further provide functional requirements that ensure data retention and data transfer from the PDHMS system to a, e.g., Corporate Oracle Database.

According to various embodiments of the present invention, the PDHMS systems support MODBUS protocol over serial interfaces (e.g., RS-232/485 serial interface) and Ethernet interfaces (e.g., added to provide large file communication bandwidth capability) to thereby extend more intelligence from the process host down to the instrument (PDHMS surface unit). As such, according to various embodiments of the present invention, the solution can also be applied to any Modbus Salve unit that supports the file creation method and that is equipped with an Ethernet port or other high bandwidth communication means. This solution is intended to meet storage and retrieval requirements for the PDHMS data during data flow interruption events, for example, due to either communication link failure and/or other failure of other components involved in the data transmission chain. That is, during a downstream communication interruption, the PDHMS surface units can store continuously acquired data, which can then later be passed along to the SCADA system once the communication link is re-established. To allow reassembly of timestamped data received from upstream PDHMS surface units, a downstream SCADA system can have a capability of acting as a time synchronization master, particularly to a RTU and PDHM(s). During normal operation, i.e., once communication is re-established and recovery is complete, the current established methodology and practices for data transmission, however, can advantageously remain the same.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 2 is a schematic block diagram of a portion of an apparatus to manage post-drilling operation data acquisition according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

Various embodiments of the present invention, in general, provide an apparatus 30 to manage post-drilling operation data acquisition which can include one or more permanent downhole monitoring system (PDHMS) surface units in communication with one or more downhole/subsurfaces sensors, one or more receiver transmitter units (RTUs), one or more network interfaces, and one or more supervisory control and data acquisition (SCADA) system host servers which together provide a data retention based apparatus/system that addresses storage requirements, collected data file management and house keeping, and system synchronization, and which has sufficient storage capacity to store downhole process data collected during a downstream communication interruption, the capability of regenerating collected data that is "lost" during an outage or during a capacity overload condition, sufficient bandwidth to allow large recovery file transmissions that do not disrupt real-time data acquisition of current data, and time synchronization capabilities with the host system to allow for recovering missing data, in the proper sequence.

Figure 1:
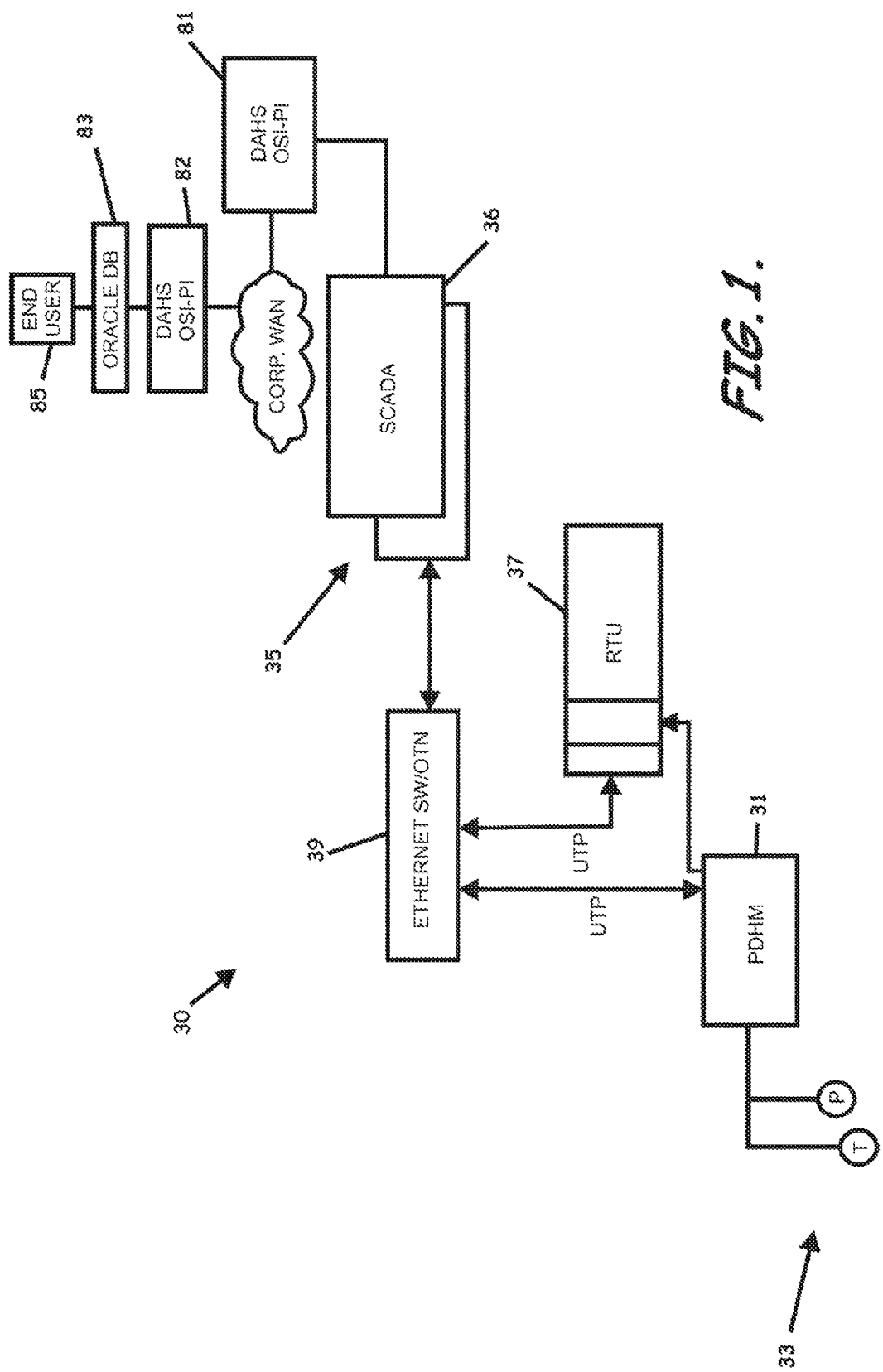
FIGS. 1 and 2 are schematic block diagrams of an apparatus to manage post-drilling operation data acquisition according to an embodiment of the present invention.
Figure 2:
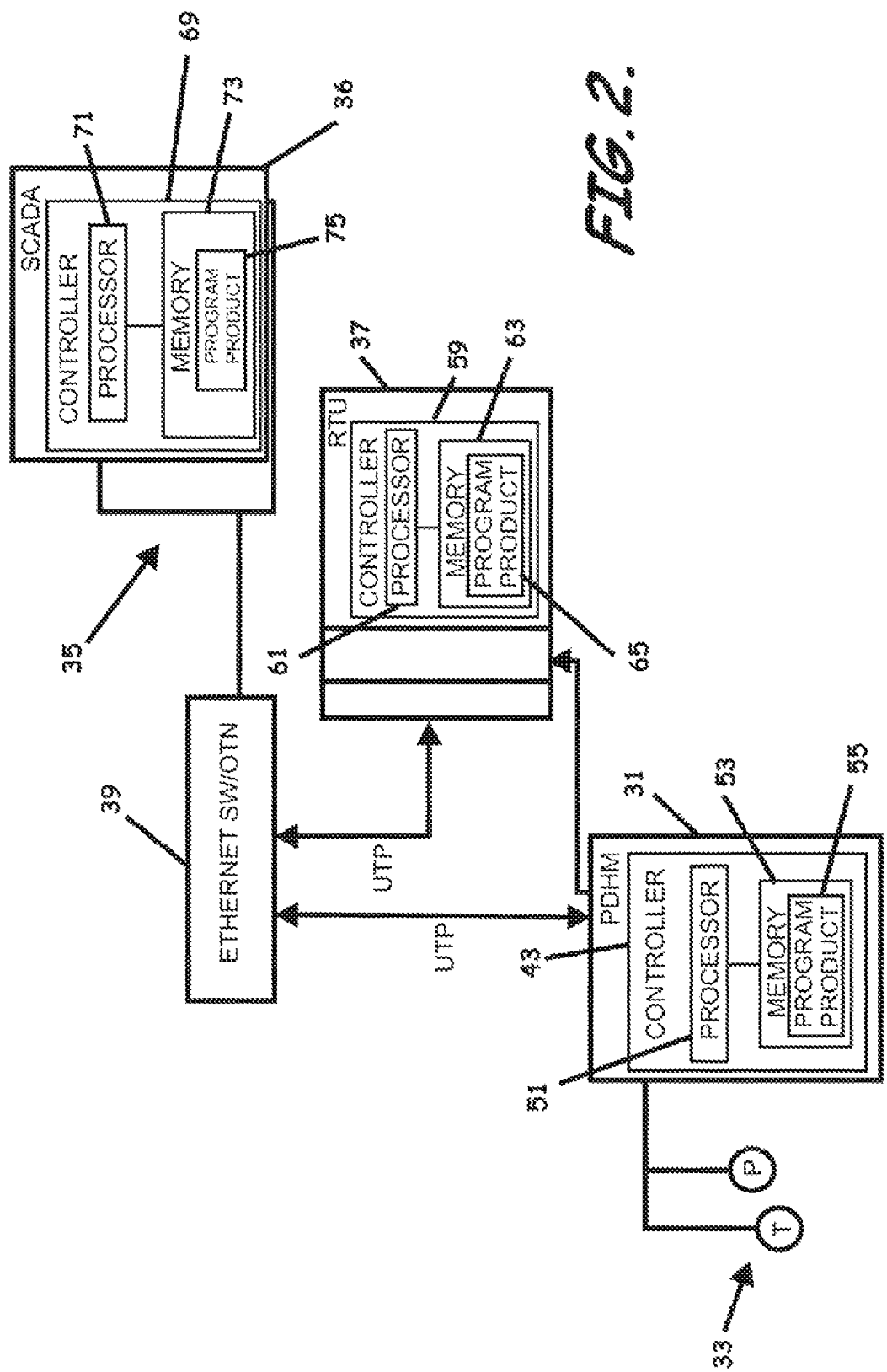

Specifically, FIGS. 1 and 2 illustrate an example of an apparatus 30 to manage post-drilling operation data acquisition, which can include at least one, but typically a plurality of permanent downhole monitoring systems (PDHMS) surface units 31 each in communication with a plurality of downhole/subsurface sensors 33 to collect real-time process data, a supervisory control and data acquisition (SCADA) system 35 to collect and organize the collected process data, and a receiver transmitter unit (RTU) 37 configured to collect the continuous real-time data collected by each PDHMS surface unit 31 and to forward to data to the SCADA system 35.

Figure 3:
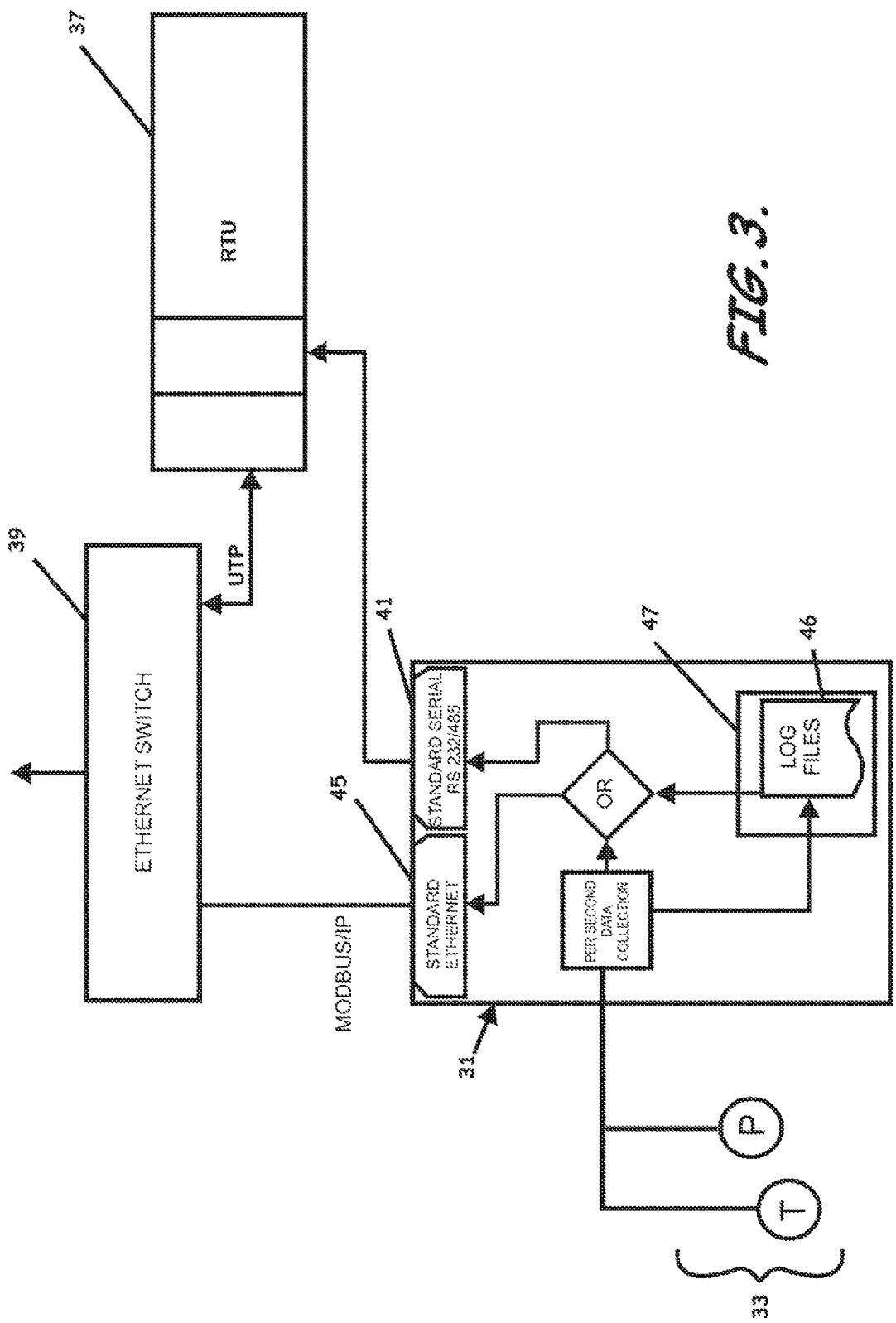
FIG. 3 is a schematic block diagram of a portion of an apparatus to manage post-drilling operation data acquisition according to an embodiment of the present invention.
Figure 4:
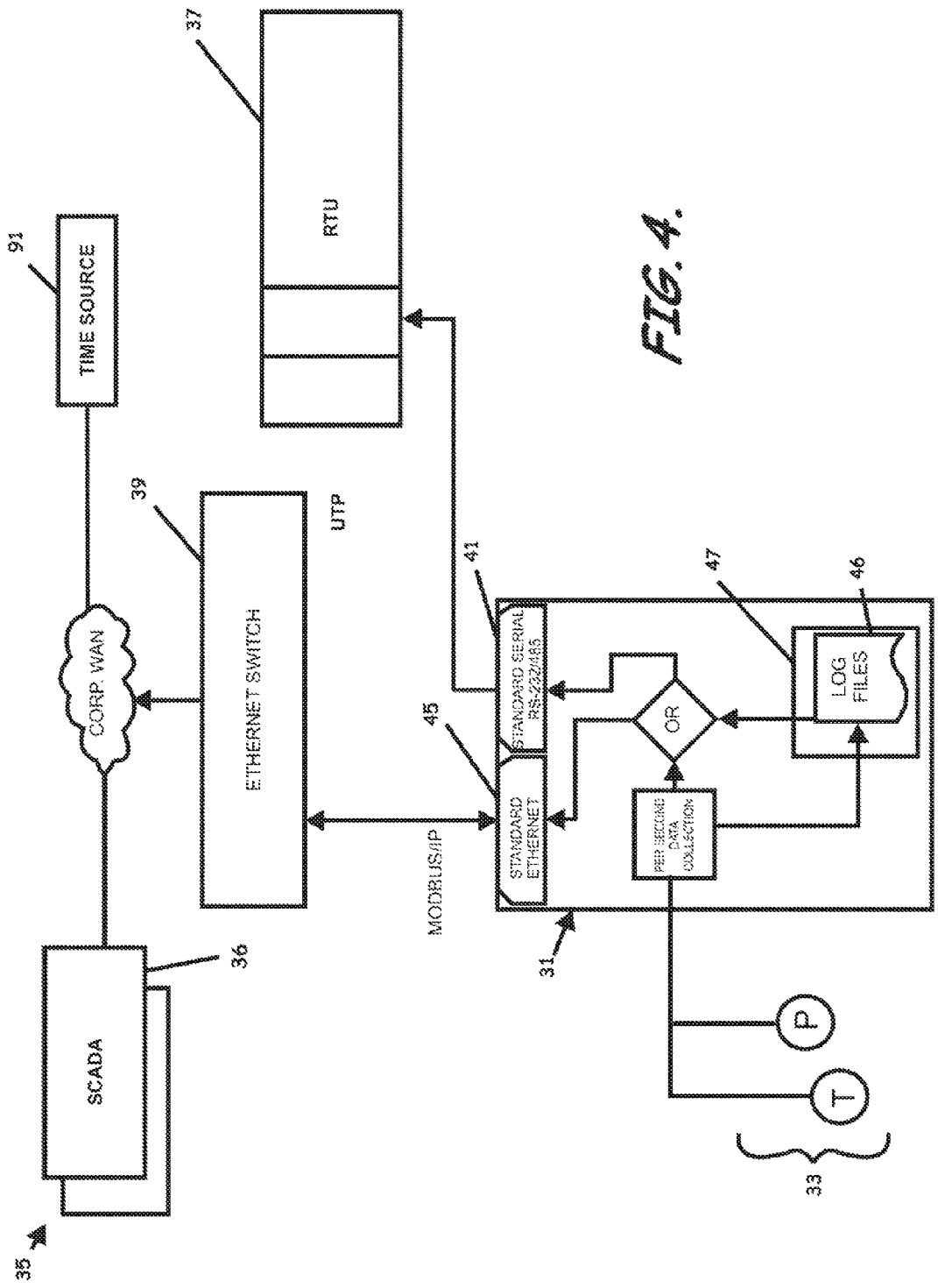
FIG. 4 is a schematic block diagram of a portion of an apparatus to manage post-drilling operation data acquisition according to an embodiment of the present invention.
Figure 5:
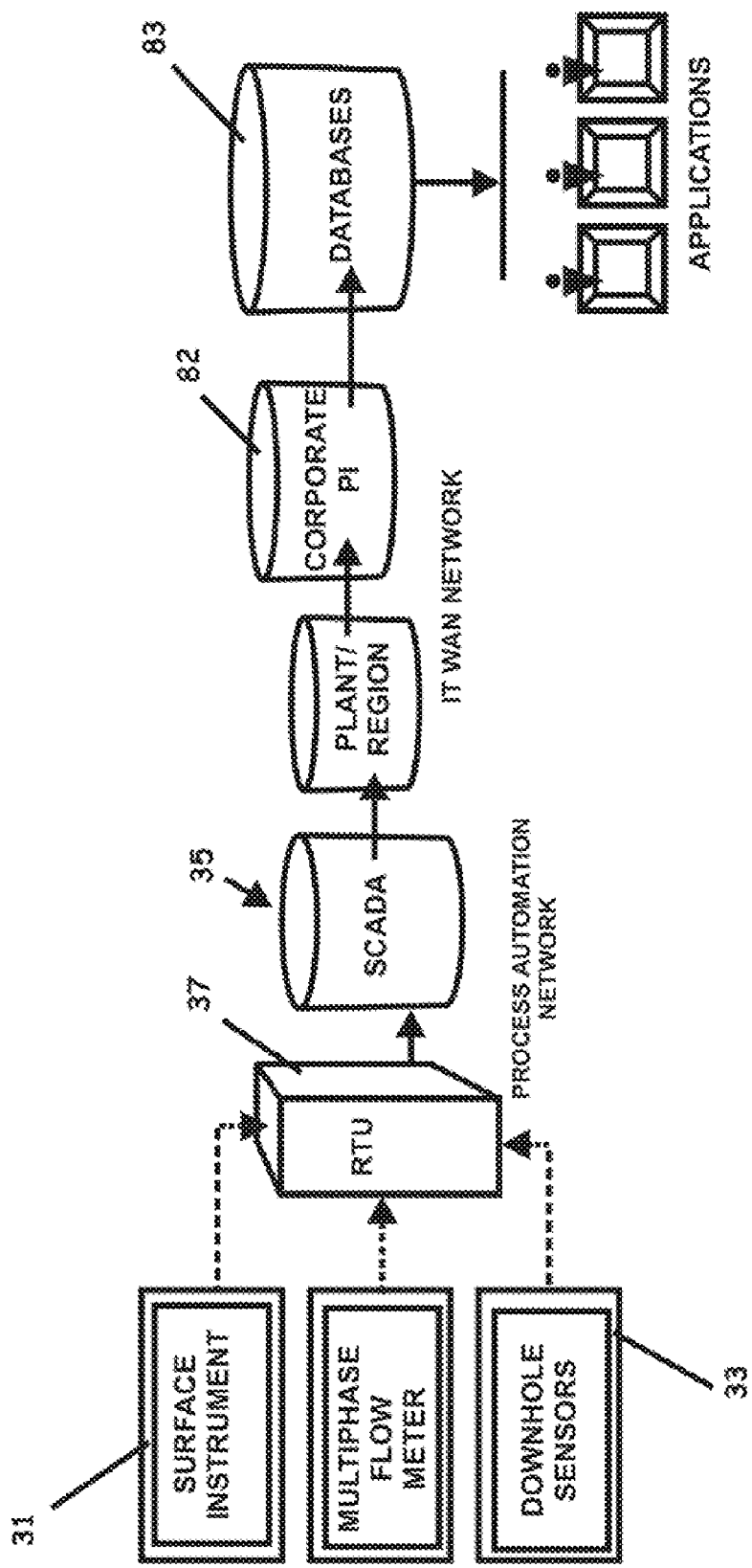
FIG. 5 is a schematic block diagram of an apparatus to manage post-drilling operation data acquisition including related components according to an embodiment of the present invention.

As shown in FIGS. 3 and 4, each PDHMS surface unit 31 can include a serial interface 41 to provide a continuous real-time data stream of captured data, and a data storage medium 47, 53, for storing collected downhole process data and having sufficient storage capacity to store downhole process data collected during the downstream communication interruption. Such "large file" storage capacity can provide a capability to regenerate collected data (e.g., records) that would be otherwise "lost" during a downstream communication link (pathway) failure downstream of the respective PDHMS, and/or during a PDHMS capacity overload condition. Each PDHMS surface units 31 can also include a control circuit or controller 43 (see, e.g., FIG. 2) configured to recognize the downstream communication link failure and configured to cause the PDHMS surface unit 31 to either continuously store potential recovery data or to store recovery data responsive to a downstream communication failure. Each PDHMS surface units 31 can further include a broadband interface 45 to provide for recovery file transmission of recovery data, for example, stored in a non-volatile storage medium 47 during the downstream communication link failure. As will be described in more detail below, such data can be provided through e.g., a multi-function or other network interface 39 such as, for example, an Ethernet switch and/or optical transport network module, either directly to the SCADA system 35 or via an intermediate host server (not shown) directly from the PDHMS surface unit 31 and/or indirectly through the RTU 37. The broadband interface 45 has sufficient bandwidth to allow large (recovery) file transmissions to thereby provide the stored collected downhole data having time synchronization capabilities, e.g., timestamp, or others, etc., to a host system, e.g., the SCADA system 35 including a SCADA system host server 36 or intermediate WebServer in communication therewith, which can then assemble/reassemble a file (e.g., 24-hour file) to include the recovered missing data in the proper order.

Figure 6:
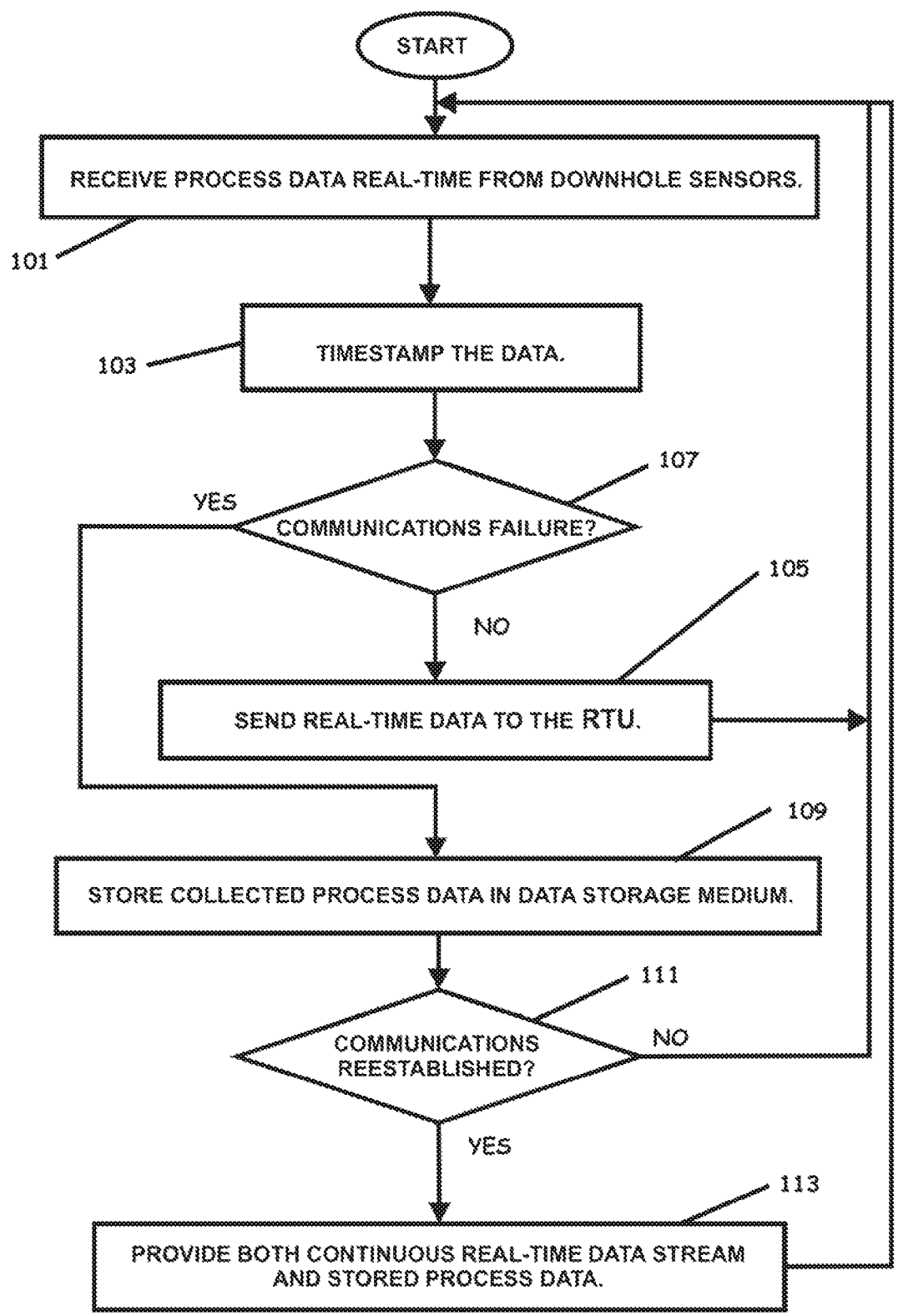
FIG. 6 is a block flow diagram illustrating functions of the PDHMS surface unit according to an embodiment of the present invention.

The controller 43 (see, e.g., FIG. 2) of each PDHMS surface unit 31 can include a processor 51, memory 53 coupled to the processor 51, and program product 55 stored in the memory 53, which include instructions that when executed by the processor 51, cause the PDHMS surface unit 31 to perform various operations to collect, store, and send, transfer, or otherwise transmit the collected downhole process data. Accordingly, as perhaps best shown in FIG. 6, each PDHMS surface unit 31 can function to perform the steps/operations of receiving process data real-time typically in the form of pairs of temperature and pressure from the associated downhole pressure, temperature, pressure-temperature sensors 33 (block 101) positioned at various depths/lateral positions, timestamping the collected data (block 103) with a common timestamp for all data downhole received at the same interval, and continuously sending/forwarding the data to the RTU 37 (block 105), or alternatively, directly to a SCADA host server 36, window communication failure exists. The steps/operations can also include recognizing/detecting when a communication link (pathway) failure (i.e., medium or component failure) exists downstream of the PDHMS surface units 31 (block 107), storing the collected process data in a data storage medium 47 at least during the downstream communication link failure (block 109), or alternatively, continuously in a storage medium configured to have a ring buffer-type function. The steps/operations can also include detecting communication reestablishment (block 111), and upon communication reestablishment providing, substantially simultaneously, both the current continuous real-time data stream of captured data, for example, over the serial interface 41 and at least portions of the stored process data in the data storage medium 47 over the broadband interface 45 to thereby provide recovery file transmission of recovery data stored during the downstream communication link failure (block 113). Note, it should be understood that alternatively, both real-time and stored data can instead be provided over the broadband interface 45.

Figure 7:
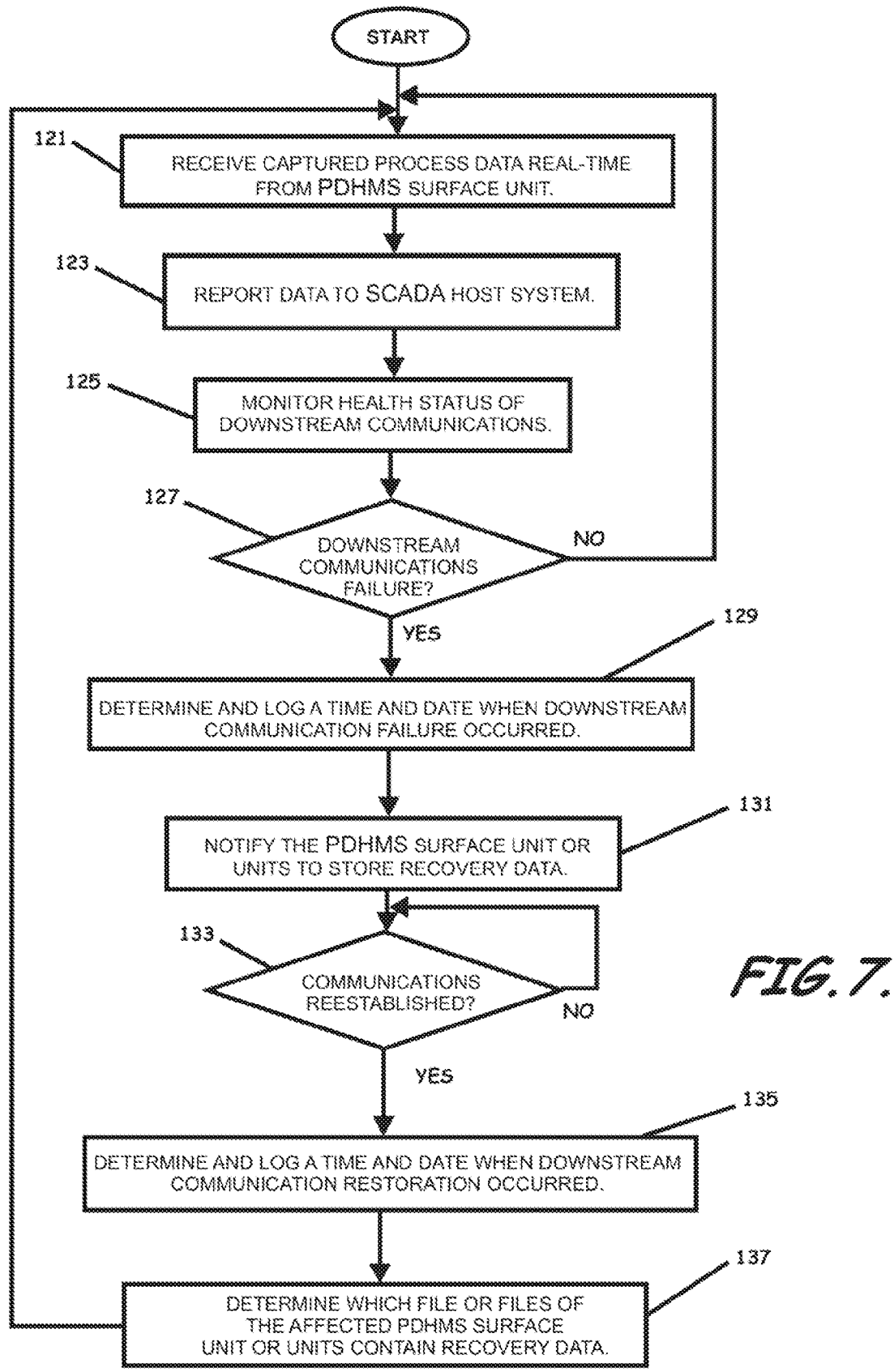
FIG. 7 is a block flow diagram illustrating functions of an RTU during a downstream communications failure according to an embodiment of the present invention.
Figure 8:
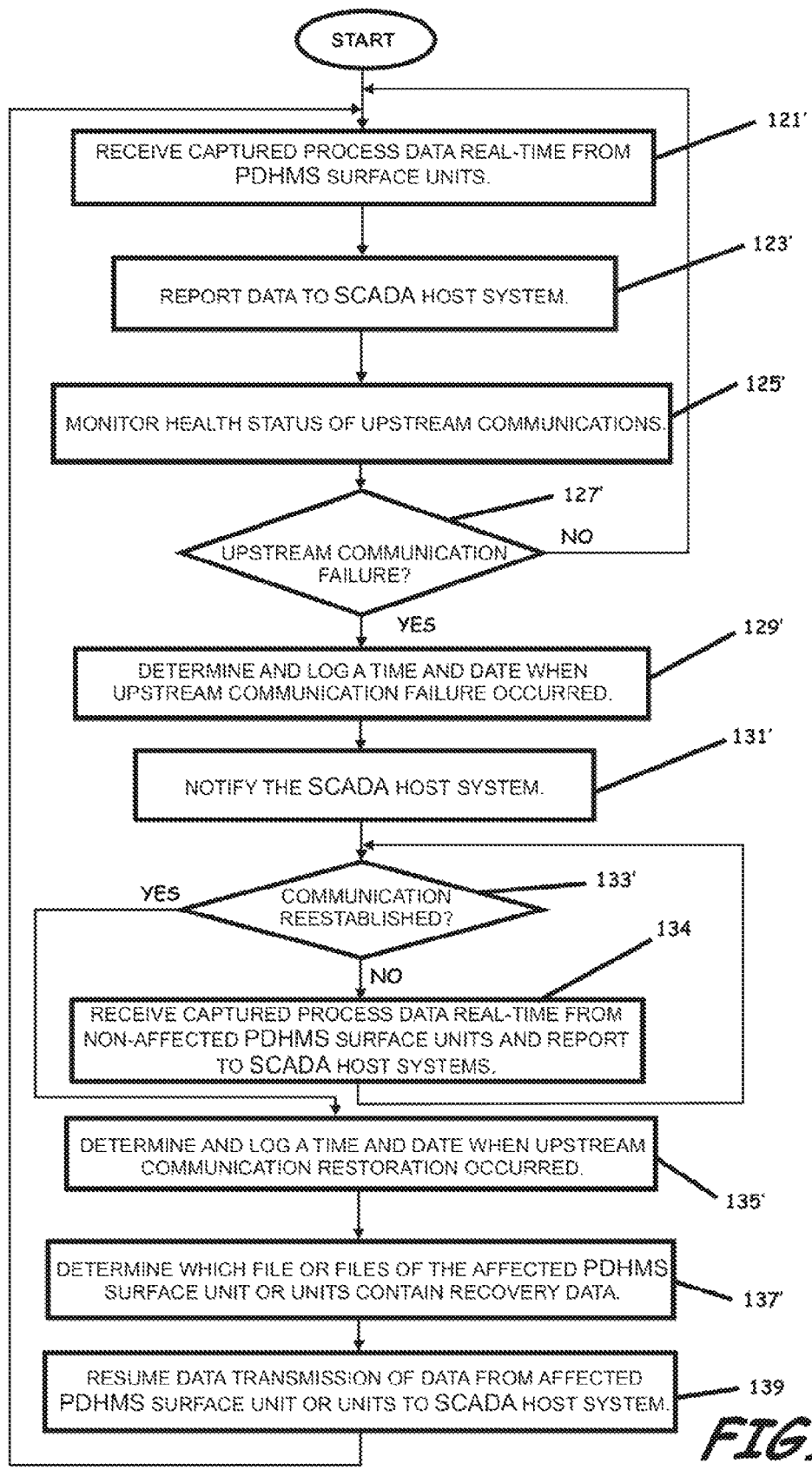
FIG. 8 is a block flow diagram illustrating functions of an RTU during an upstream communications failure according to an embodiment of the present invention.

The RTU(s) 37 can similarly include a control circuit or controller 59 (see, e.g., FIG. 2) containing a processor 61, memory 63 coupled to the processor 61, and program product 65 stored in the memory 63 and including instructions that when executed by the RTU processor 61, cause the RTU 37 to perform various operations to also collect, store, and report the downhole process data. Accordingly, as shown in FIGS. 7 and 8, under normal operations, the RTU 37 continually collects the real time process data provided by the one or more PDHMS surface units 31 (block 121, 121') and sends or otherwise transmits data to the SCADA host system 35 (block 123, 123'). The RTU 37 also functions to monitor downstream and upstream communications (block 125, 125') to detect either an upstream or a downstream communications link failure.

As further shown in FIG. 7, upon detecting/determining a failure of a downstream communications link (block 127), the RTU 37 can function to perform the steps/operations of recognizing the downstream communication link failure occurring downstream of the RTU 37 and logging a time and date when the downstream communication failure occurred (block 129), and communicating with each associated PDHMS surface unit 31 to cause the PDHMS surface unit or units 31 to store recovery data during the downstream communication failure if not already being accomplished (block 131). The RTU 37 then proceeds to monitor for communication reestablishment (block 133) and records to time and date when restoration occurs based on duration or on actual clock time (block 135), and can determine which of the files of the affected PDHMS surface units 31 to contain recovery data for the affected time period (block 137).

As further shown in FIG. 8, upon detecting/determining a failure of an upstream communications link (block 127'), the RTU 37 can function to perform the steps/operations of recognizing the communication link failure occurring upstream of the RTU 37, logging a time and date when the upstream communication failure occurred (block 129'), and can notify the SCADA system 35 of the upstream communications failure (block 131'). The RTU 37 then proceeds to monitor for communication reestablishment (block 133') and to receive captured process data real-time from any non-affected PDHMS surface units 31 (block 134). Upon reestablishment, the RTU 37 records to time and date when restoration occurs (block 135'), determines which file or files containing recovery data are to be accessed and retrieved from the respective PDHMS surface unit (block 137'), and resumes reporting of data from the previously affected PDHMS surface units (block 139). According to a preferred configuration, the file or files can be selected responsive to the time of interruption of a respective one of the one or more of failed upstream communication links and/or the time of restoration of the respective one or more failed upstream communication links. This can particularly be the case where the data extends over multiple 24-hour storage/recovery files.

Figure 9:
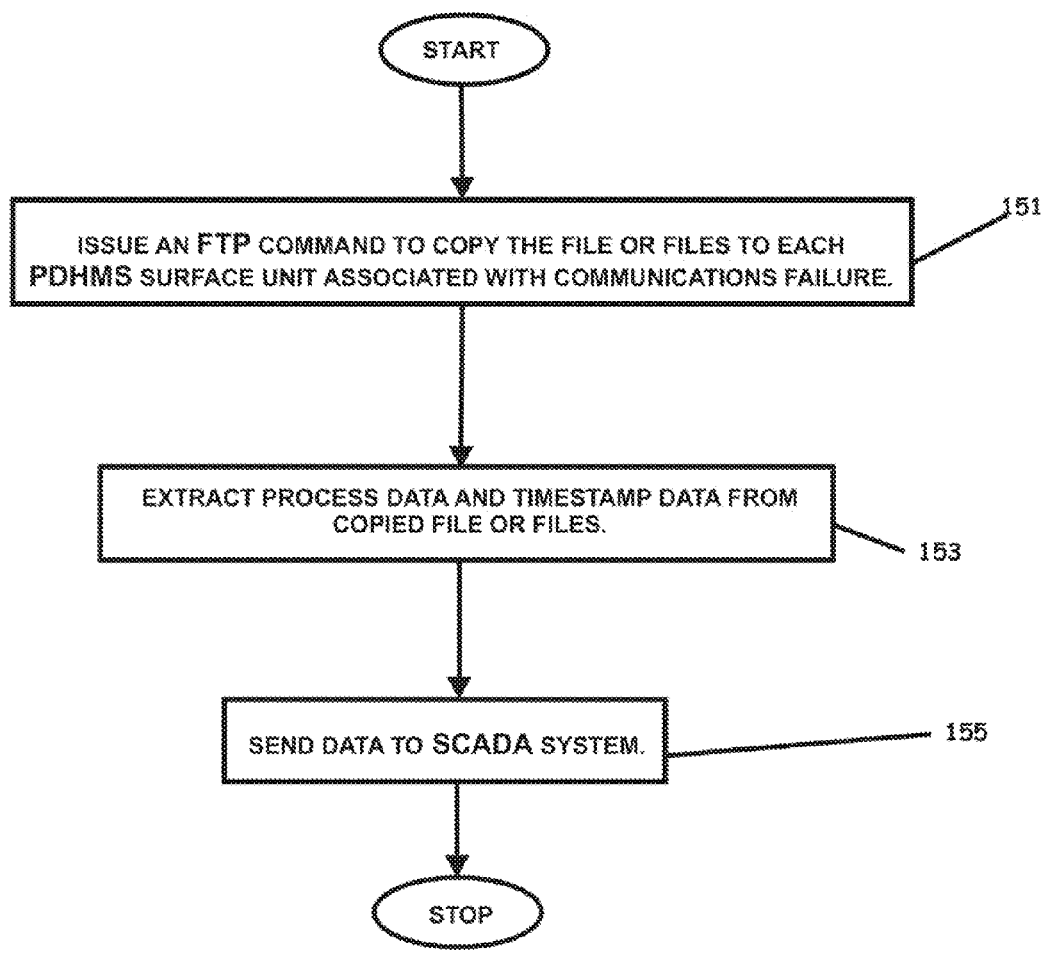
FIG. 9 is a block flow diagram illustrating post-communication restoration data management functions of an RTU according to an embodiment of the present invention.
Figure 10:
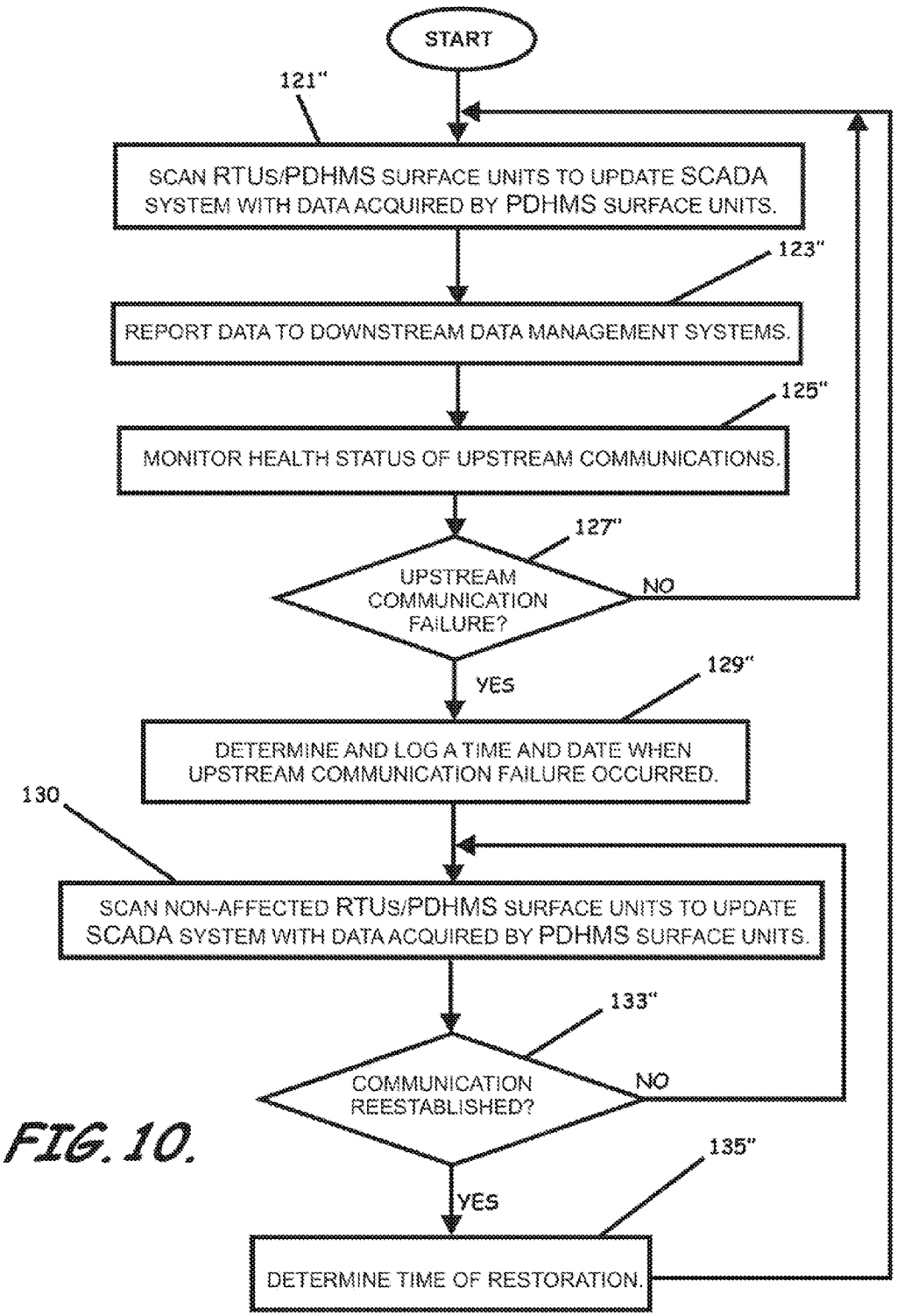
FIG. 10 is a block flow diagram illustrating functions of a SCADA system during an upstream communications link failure according to an embodiment of the present invention.

As shown in FIG. 9 and as will be described in more detail below, the steps/operations performed by the RTU 37 to retrieve the missing data can include issuing an FTP command to copy the file or files including recovered data relating to the data previously captured by one of the PDHMS surface units 31 and not delivered due to the upstream communication failure (block 151), extracting process data and timestamp data from the copied file or files (block 153), and sending the data, for example, as a continuous stream or as one or more files, to the SCADA system 35, e.g., through standard history transfer (block 155). Note, according to the exemplary embodiment of the present invention, the processed data to be copied begins at the time of interruption of the failed upstream communication link and ends at the time of restoration of the failed upstream communication link. The SCADA host server 36 can similarly include a control circuit or controller 69 (see, e.g., FIG. 2) containing a processor 71, memory 73 coupled to the processor 71, and program product 75 stored in the memory 73 and including instructions that when executed by the SCADA host server processor 71, cause the SCADA host server 36 to perform various operations to acquire, store, format, and forward the process data collected by each of the PDHMS surface units 31, to perform as a time synchronization master for the PDHMS surface units 31 and the RTU 37, and to monitor communications between each of the PDHMS surface units 31 and associated RTU 37 and the RTU 37 and the SCADA system 35. Accordingly, as shown in FIG. 10, under normal operations, the SCADA host server 36 collects data representing the real time process data provided by the one or more PDHMS surface units 31, for example, according to an RTU report by exception scheme, described later, (block 121") and sends or otherwise reports data to the downstream data management systems, e.g., data historian 81, Oracle database 83, end-user 85, etc., (block 123"). The SCADA host server 36 also functions to monitor upstream (and downstream) communications (block 125") to detect either an upstream or a downstream communications link failure.

As further shown in FIG. 10, upon detecting/determining a failure of an upstream communication is link (block 127"), the SCADA host server 36 can function to perform the steps/operations of recognizing the upstream communication link failure occurring upstream of the SCADA host server 36 and logging a time and date when the upstream communication failure occurred (block 129"), and which of the upstream communication links (pathways) is affected. The server 36 proceeds to monitor for communication reestablishment (block 133"). If not all pathways leading to the SCADA host server 36 are affected, such as, for example, where the server 36 is in communication with multiple network interfaces 39 or is in direct communication with the RTUs 37 or the individual PDHMS surface units 31, the server 36 continues to collect available data provided by the non-affected RTUs 37 or PDHMS surface units 31 (block 130). Upon reestablishment, the server 36 records to time and date when restoration occurs (block 135"). According to an embodiment of the server 36, the server 36, rather than, or in addition to, the RTUs 37, can determine which file or files 46 containing recovery data are to be accessed and retrieved from the respective PDHMS surface unit.

Figure 11:
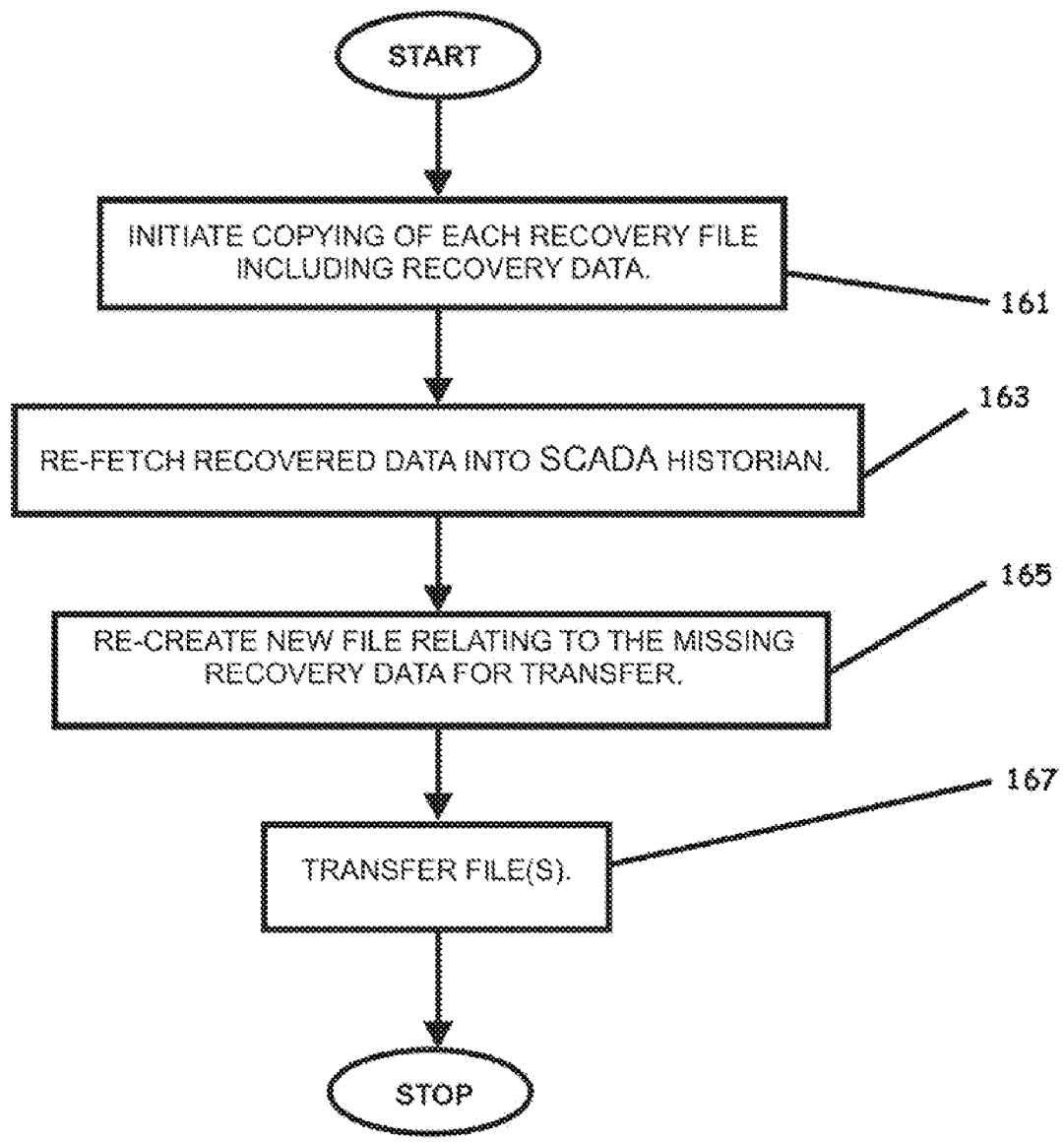
FIG. 11 is a block flow diagram illustrating post-communication restoration data management functions of a SCADA system according to an embodiment of the present invention.

As shown in FIG. 11, and as will be described in more detail below, the steps/operations performed by the SCADA system host server 36 to retrieve the missing data previously captured and stored by the affected PDHMS surface units 31 and not delivered due to the upstream communication failure can include for each affected PDHMS surface unit 31: initiating copying of each "recovered" or "recovery" file including recovery data relating to the data previously captured by the PDHMS surface unit 31 and not delivered due to the upstream communication failure (block 161), refetching the recovered data, for example, into a SCADA historian (block 163), re-creating a new file relating to the missing "recovery" data from the recovery files for transfer over a downstream communication link downstream of the SCADA host (block 165), and transferring the new file(s) (block 167).

Note, according to one configuration, during copying of the recovery files, the SCADA system host server 36 can also simultaneously capture the real-time data relating to data currently captured by each affected PDHMS surface unit 31, either directly from the affected PDHMS surface unit 31 or from the RTU 37. Note also, although the above steps/operations were indicated as being performed by the SCADA host server 36, it should be understood that the reference to the SCADA host server 36 can include either a stand-alone server (not shown) in communication with the SCADA host server 36 or the SCADA host server or cluster of servers 36, itself. When a stand-alone server is used as an agent of the SCADA host server 36, the transmitted archive or real-time data is sent from the host server to the SCADA host server 36, for example, via FTP or OPC OPC-HDA (historical data access)/UA. Note further, the SCADA system 35 or an independent time server 91 (see, e.g., FIG. 4) can be configured to function as a time synchronization master to each of the PDHMS surface units 31 and the RTU(s) 37 to help ensure that the recovered data does not overlap previously received data received in real-time. Still further, regardless of the recovery scenario, according to a preferred configuration, the RTU 37 can be configured to maintain a capability to store, archive, upload, and re-fetch all process data, with the exception of the PDHMS exception and compression tags stored in the SCADA host server database.

Additional detail of the above described functions with respect to the PDHMS surface unit layer, time synchronization, the RTU layer, data retrieval requirements, the SCADA host layer, the PI system layer, the Oracle database system layer, are described below:

PDHMS Surface Unit Layer

According to an embodiment of the present convention, each PDHMS surface unit 31: can be equipped with both serial RS485 and Ethernet Interfaces 41, 45; can be equipped with mass storage capacity with a minimum of 1 GB scalable when needed; can support the Modbus communication protocol for both interfaces i.e., Serial Modus and Modbus over IP; can collect subsurface sensor data (e.g., pressure and temperature readings with IEEE 32 floating point format) at one sample per second intervals; can time stamp all collected sensor data upon collecting the data; and can support an FTP function to enable, e.g., large file transfer to the RTU 37 or SCADA host server 36. The file transfer protocol function requires an FTP client and FTP server. The PDHMS surface unit 31 can act as the FTP server. The client can be in the RTU 37 or in the SCADA host server 36, depending upon the desired configuration. Also, a client and server FTP configuration can be installed on the PDHMS surface unit 31 and/or at either the RTU 37 or the SCADA host server.

According to the preferred configuration, the PDHMS surface unit 31 can support file creation functionality (i.e., store/archive) collected data as Comma-Separated Values (CSV) file(s) 46 in a local storage medium 47, continuously based, for example, on a one second basis. Beneficially, the file 46 can act as a recovery file in the event of a downstream communication link interruption or failure. Note, such data contained within the file 46 should not require scaling. Further, the local storage medium 47 can be integrated with the PDHMS surface unit 31 to enhance modularity of the surface unit 31. The PDHMS surface unit 31 can allow copy access by the RTU 37/SCADA 35 while the file is being continuously updated, to enhance post-communication reestablishment file recovery. That is, the file access configuration is such that there is no file access violation during the process of accessing the file 46 by the host (SCADA/RTU). The PDHMS surface unit 31 updates (writes to) the CSV file 46 with the captured downhole process data such that a new record is added to the file at each second.

To enhance organization, the PDHMS surface unit 31 can create a directory for each month. In a specific example, the directory name is the first three letters of the month followed by YY, for example, MMMYY (e.g., Sep07); and the file name is in the format YYYY-MM-DD.CSV.

Also according to the specific example, the file format can be in a text format with delimitation using commas or tabs, only. The File table format can be as follows:

| | |
|---|---|
| 1st Line: | PDHMS surface unit unique ID; |
| 2nd Line: | Time, PSI, Deg F., PSI, Deg F., PSI, Deg F. |
| 3rd line: | HH:MM:SS, Press1, Temp1, Press2, Temp2, Press3, Temp3 |
| 4th line: | HH:MM:SS, Value, Value, Value, Value, Value, Value |

Note, the 1st line PDHM Unique ID can be oil field specific and should be consistent across all the oil fields. The 2nd line includes the engineering units of the PDHM gages. This line is provided for readability of the CSV file, only. The SCADA/RTU can ignore this line during the data retrieval process. The 3rd line can include the PDHM gages reading, e.g., in pressure-temperature pairs. The SCADA/RTU/PI/Oracle DB logic can drive the number of data points the CSV file contains. The 4th line time can be expressed in ISO 8601 time stamp format string (e.g. "YYYYMMDDHHMMSS").

According to an embodiment of the present invention, the PDHMS surface unit 31 is also configured to provide file deletion housekeeping based on first file created to be first deleted once the overall storage capacity reaches, for example, eighty percent of the total storage capacity of the PDHMS surface unit 31.

Further, according to an embodiment of the present invention, the PDHMS surface unit 31 can accept time synchronization initiated by the SCADA host server 36 or the RTU 37, for example, as described below, and can use the time values written by the host server 36 to update it's internal clock.

Time Synchronization:

As identified previously, SCADA, RTU and PDHMS surface unit time can be synchronized based on the same timing source. There are at least two options that can be used to achieve this requirement. The first option is based, for example, on a GPS/time server 91 (see, e.g., FIG. 4) utilizing, e.g., a simple network time protocol (SNTP) for end to end Ethernet based devices. The second option is based, for example, on utilizing the method described below for devices that are based on serial MODBUS implementation.

According to the second option, the standard time synchronization function of the SCADA/RTU communication protocol (e.g., BSAP, DNP, etc.) can be used to synchronize the RTU 37. The following are time synchronization requirements for Serial Modbus device implementation, with the timestamp portion of the record comprising, for example, six consecutive registers (32-bit unsigned integers) containing year, month, day, hour, minute, seconds. The register value format (4xxxx) containing control information is as follows:

| Register | Value | Format |
| --- | --- | --- |
| 4xxxx | Contains the following control information from the left:<br>Bit 1: Set Clock Values<br>Bit 2: Read Clock Values<br>Bit 3: Done<br>Bit 4: Error | 16 bit unsigned integers |
| 4xxxx+1 | Contains the year | 16 bit unsigned integers |
| 4xxxx+2 | Contains the month | 16 bit unsigned integers |
| 4xxxx+3: | Contains the day | 16 bit unsigned integers |
| 4xxxx+4: | Contains the hour (using the 24-hour clock). | 16 bit unsigned integers |
| 4xxxx+5: | Contains the minutes. | 16 bit unsigned integers |
| 4xxxx+6: | Contains seconds. | 16 bit unsigned integers |

Remote Terminal Unit (RTU) Layer:

According to an embodiment of the present invention, the physical interface between the PDHMS surface unit 31 and the RTU 37 can include either serial RS-232/485 interface 41 or Ethernet 45, to provide for the dataflow requirements. In both cases, the communication protocols can be standard MODBUS. Note, the "RS" designation is becoming interchangeably used with "EIA". Accordingly, RS-485 and EIA-485 is used in industry refer to the same device.

The RTU 37 can read/poll PDHMS data containing time, pressure and temperature every second. In order to reduce communication requirements, the PDHMS data points (i.e., pressure, temperature) stored in the RTU 37 and SCADA host database (not shown), can be configured as a "report by exception" (RBE) with the following dead band: Pressure: ±0.01 PSi, Temperature: ±0.1 degrees.

Regarding dataflow, according to a preferred configuration, the SCADA host server 36 can read pressure and temperature data points along with the time stamp from the RTU 37 once every sixty second regardless of the RBE dead-band. The RTU 37 can monitor the health status of the communication link (including the medium and intermediate components) between the RTU 37 and the PDHMS surface unit 31, and can correspondingly report the failure of the communication link to the SCADA host server 36 as a high priority alarm.

When a communications error occurs between the PDHMS surface unit 31 and the RTU 37, the RTU 37 can detect the failure and log the time and/or date when the communication failure occurred, and later, the time and/or date when communications is restored. In response to restoration of the communication link, RTU 37 can interpret/determine which file or file(s) containing 24-hour data is/are to be accessed and retrieved from the PDHMS surface unit 31. According to a preferred configuration, there are two options in supporting data retrieval for the stored file in the PDHMS surface unit 31. Option 1 utilizes functionality in the RTU 37, described in additional detail later. Option 2 utilizes functionality in the SCADA host server 36, also described in additional detail later.

SCADA Host Layer:

The SCADA system 35 supports various capabilities that prevent the loss of data during a communication link failure. For example, the SCADA host server 36 can continuously monitor any communications failure between each RTU 37 and associated PDHMS surface unit 31 and between the SCADA host server 36 and each RTU 37. In normal operation (all the components are healthy), the SCADA host server 36 scans/polls the RTUs 37 based on specified "Report By Exception" settings to update the SCADA host system 35 with data acquired from the PDHMS surface units 31. Upon loss of data acquisition from a PDHMS surface unit 31, the SCADA host server 36 or the RTU 37 can detect the time communications were interrupted, and later, the time when communications are eventually restored. As noted above, data retrieval of the stored recovery file or files 46 in the PDHMS surface unit 31 is accomplished either by utilizing functionality built in the RTU 37, or by utilizing functionality in the SCADA host server 36, described in more detail in the next section. To this end, the SCADA system 35 can include an Object Linking and Embedding for Process Control (OPC)-server (not shown) which can be provided with OPC data access (DA) functionality used for normal operation, and OPC historical data access (HDA) functionality for data history recovery.

Data Retrieval Requirements (File Transfer).

As noted above, according to an embodiment of the present invention, there are two preferred options in supporting data retrieval for the stored file in a PDHMS surface unit 31 as a result of restoration of a failed communication pathway. Option 1 can be performed utilizing functionality in the RTU 37, and Option 2 can be performed utilizing functionality in the SCADA host server 36.

According to Option 1, recovery data is retrieved by the RTU 37. The RTU 37, for example, can be configured with the necessary hardware and software/firmware/program product 65 to issue an FTP command to copy the appropriate file or files 46 based on communication failure time and/or date and communications restored time and/or date. If there is more than one PDHMS surface unit 31 connected to the same RTU 37, the RTU 37 is configured to perform the same process to each associated PDHMS surface unit 31. Regardless, after copying the appropriate file or files 46, the RTU 37 extracts process data and the time-stamp from the copied twenty-four hour CSV recovery files 46 based on the pre-defined file data format. The data extracted can start from the communication failure time and/or date and end at the communications restored time and/or date, e.g., based on the duration of the outage. After data extraction, the RTU 37 sends the extracted data to the SCADA host system 35 (e.g., host server 36) through standard history transfer procedures for processing, as described with respect to Option 2.

According to Option 2, the SCADA host 35 (e.g., SCADA host server 36) retrieves the data. The SCADA host server 36 can initiate a copy of the file or files 46 pertaining to the failure time (recovered data) while continuously capturing real time data. The copy function can be performed either by the PDHMS surface unit 31, or by the RTU 37, for example, according to the process described in option 1. The SCADA host server 36 then refetches the recovered data into a SCADA historian 81, re-creates or otherwise generates a new CSV file pertaining to the missing data from the recovered file received from the RTU 37 or PDHMS surface unit 31, and transfers the file(s) to the PI Interface Nodes (described below). Should the file transfer process fail during the transmission process, the file process can be repeated until the file is copied successfully.

PI System Layer:

During normal operation, the SCADA data historian (OSI PI) 81 communicates with the SCADA OPC server using OPC DA protocol. Note, for dedicated PI Interface Node machines, an OPC Tunneller can be used to bridge connection between SCADA OPC server distributed component object model (DCOM) and PI Interface Node DCOM objects. Upon losing and restoring a connection to the PDHM/RTU/SCADA, the SCADA OPC server can deliver the CSV file to the PI Interface Node directory.

The SCADA CSV file, according to a preferred configuration, utilizes the following File Name convention, having the same contents as the CSV file created by the PDHMS surface units 31:

Wxxxx_c_yymmddh1h2.csv, whereby.

"Wxxxx" is the well identification (PDHM unique ID);

"_" (underscore) is the string separator;

"c" is the number of exception tags in data row inside a file (2, 4 or 6)—2nd and 4th line;

"yymmdd" is the date;

"h1" is the failure start time hour (00 to 23); and

"h2" is the duration of failure—number of hours (01 to 24).

When the SCADA CSV file is successfully delivered to the PI Interface Node directory, a program running on the PI Interface Node can trigger the history recovery actions. The running program can activate an OPC HDA client on the PI Interface Node directory that triggers the OPC HDA client to query the SCADA server. The history recovery period can be derived, for example, from CSV file name created by the SCADA OPC server, which can follow the File Name convention described above. Note, according to the exemplary configuration, this history recovery period is provided to be used for PI specification history recovery, only.

The running program on the PI Node interface can directly activate data propagation from PI Interface Node to consecutive PI Servers and ORACLE database 83. As such, the OPCHDA Interface one time batch for the PI Interface Node, the PI to PI Interface one time batch for consecutive PI Servers (local PI Server, area PI Server, central PI Server), and the RDBMSPI Interface one time batch for the Corporate PI Server, can be started with specification history recovery only.

Data can be stored to PI archive database as it arrives from the SCADA OPC HDA database. Exception and compression tags can be bypassed as the data will be arriving out-of-order. Affected interfaces include the OPCHDA Interface, each PI to PI Interface, and the real-time database management system PI (RDBMSPI) Interface. Note, according to the exemplary embodiment of the present invention, the exception and compression for I-Field tags is not pre-configured on the PI-OPC Interface, PI to PI Interface, or RDBMSPI Interface.

After a CSV file has been processed, the file can be renamed with an extension indicating successful or erroneous processing. After a preselected/preselected time period, in order to reduce storage requirements, such files that have been processed without errors can be deleted.

SQL/Oracle Database System Layer:

Communication between the corporate central PI server and the SQL/Oracle database 83 can be managed via the RDBMSPI Interface (not shown). This is a specific interface that can exchange data between PI archive database and SQL database (Oracle). The Oracle database 83 can receive real-time data through the PI server RDBMSPI interface during normal operations. Upon communication and/or system failure, the Oracle database 83 can be on a standby waiting on the communication/system restoration. Responsively, the PI system can activate another RDBMSPI instance between the PI server and Oracle through which the PI server can send the recovered missing data to Oracle. Oracle will then re-index the missing data into the proper order within the Oracle database 83.

Software/Program Product Enhancements:

It should be understood by one of ordinary skill in the art, that in order to meet the scalable data retention goal (i.e., at least seven days, but more preferably, at least thirty days or higher), fast data update frequency and provide reliable data from the PDHM system 30 to the Corporate Oracle Database 83, there are number of software/program product features and functionality that have been separately distributed to each of the PDHM surface units 31, each RTU 37, the SCADA host server 36 or agent host server thereof, the PI Interface Nodes, the Corporate PI, and the Oracle database 83, itself, which cause such systems to be "special purpose" systems uniquely configured with respect to such systems in conventional form.

Further, it is important to note that while various embodiments of the present invention have been described in the context of a fully functional apparatus (see, e.g., FIGS. 1-5), those skilled in the art will appreciate that the mechanism of at least portions of the present invention and/or aspects thereof are capable of being distributed in the form of a computer readable medium in a variety of forms storing a set of instructions for execution on a processor, processors, or the like, and that embodiments of the present invention apply equally regardless of the particular type of signal bearing media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD R/RWs, IID-DVDs, memory sticks, mini disks, laser disks, Blu-ray disks, flash drives, and other newer types of memories, and certain types of transmission type media such as, for example, digital and analog communication links capable of storing the set of instructions. Such media can contain, for example, both operating instructions and the operations instructions related to the method steps/operations associated with each of the PDHMS surface units 31, RTU(s) 37, and SCADA host server 36, described above.

Beneficially, various embodiments of the present invention provide a solution that is intended to meet storage and retrieval requirements for the PDHMS data in the event of data flow interruption due to either communication medium failure and/or other failure of other component involved in the data transmission chain (collectively referred to as a communication link or pathway failure), which during normal operation, can leave intact the current established methodology and practices for data transmission (i.e., remains the same during normal operations), and which can be applied to any Modbus Salve unit that support a compatible file creation method and that is equipped with a high bandwidth transmission capability—e.g., equipped with an Ethernet port, etc.

Various embodiments of the present invention beneficially provide a solution to retrieve process data generated and stored in the PDHMS surface units 31 and make the data available to all other systems, which can satisfy scalable data storage and retrieval of PDHMS data in the event of data flow interruption due to either communication medium failure and/or failure of other component involved in the data transmission chain. According to various embodiments of the present invention, such a solution is based on the introduced capability of the PDHMS surface units 31 to log scanned data into, e.g., a CSV file, for extended periods of time while making real-time data available to be pulled by a host system during normal operation. In the event of data flow interruption, data logged in the CVS file will be transferred from the PDHM surface unit 31 to all upper layers including the SCADA host server 36, PI server 82 and the Oracle Database 83 to fill in the missing data.

Various embodiments of the present invention beneficially provide enhanced focus on the PDHMS surface unit-to-host data flow logic resulting in data retention based system, and address various functional aspects including storage requirements, collected data file management and house keeping, system synchronization, and integration of a FTP function in a dataflow that results in the data retention based system. Various embodiments of the present invention also beneficially provide data accessibility through a web server or through an actual host communication modbus TCP or other telecontrol type protocols ((DNP 3, Profibus, etc.). Various embodiments of the present invention also beneficially provide an apparatus that is independent of the interface (Ethernet, serial, or both) for the PDHMS surface units 31, and that is independent of the downhole sensor medium (i.e., wireline/wireless) and its embedded logic. Various embodiments of the present invention provide a bandwidth management approach by defining a deadband on the collected data so other unusable data is not transmitted between the surface unit/RTU and the host, but that nevertheless enforces data quality, for example, by using a deadband on per second collected data coupled with an actual reading every sixty seconds.

Various embodiments of the present invention beneficially provide an integrated system solution utilizing e.g., a star network having an enhanced focus on one entity permanent downhole monitoring and data acquisitions system. Various embodiments of the present invention can be based on a stand alone integrated system with client/server and communication interface capabilities, which can be independent of the communication physical characteristic (fiber, Ethernet CAT 5, 5e, 6). Various embodiments of the present invention provide scalable data storage that can support a months worth of data based on sample frequency per one second, use of a monthly file directory scheme—e.g., one directory per month, one file per day (24-hr) having an oilfield specific PDHM unique ID, one record per second containing captured downhole process data points each including real-time pressure and temperature pairs captured substantially simultaneously for each set of separate and spaced apart downhole sensors 33, preferably delimited using commas or tabs only; along with a house keeping scheme whereby first-in-time files are iteratively deleted upon the PDHMS storage capacity reaching eighty percent of total capacity, e.g., a minimum of 1 GB, such as, for example, through use of a ring-type buffer arrangement. Various other benefits according to various embodiments of the present invention include use of both serial Modbus (e.g., over serial RS-485) and Modbus over IP (e.g., Ethernet), time stamping of data, and system-wide synchronization of data provided, for example, in the following format YYYMMDDHHMMSS, used to update the internal clock of all PDHMS surface units 31 and RTUs 37.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, the detailed description for primarily focused on the RS-485 serial interface. Next-generation serial interfaces which would replace the RS-485 serial interface would be understood to be within the scope of the present invention, and would be understood to be an equivalent thereof.

The invention claimed is:

1. An apparatus to manage post-drilling operation data acquisition, the apparatus comprising:
   a plurality of permanent downhole monitoring system (PDHMS) surface units each comprising:
      a serial interface to provide a continuous real-time data stream of downhole process data including a plurality of captured downhole process data points each comprising a plurality of real-time pressure and temperature pairs captured substantially simultaneously via a plurality of separate and spaced apart downhole sensors,
      a volatile data storage medium to temporarily store each captured data point,
      a nonvolatile data storage medium to store each captured data point collected during a downstream communication link failure located downstream of the respective PDHMS surface unit defining recovery data,
      a broadband interface to provide for recovery file transmission of the recovery data stored in one or more recovery files during the downstream communication link failure, and
      a controller configured to detect the downstream communication link failure downstream of the respective PDHMS surface unit when occurring and to cause the respective PDHMS surface unit to store the recovery data in the nonvolatile PDHM storage medium in one or more recovery files during the downstream communication failure downstream of the PDHMS surface unit;
   a receiver transmitter unit (RTU) in communication with the serial interface of each of the plurality of PDHMS surface units and including a controller configured to collect the continuous real-time data stream of process data collected by each of the plurality of PDHMS surface units, to detect a downstream communication link failure downstream of the RTU, to communicate with each of the plurality of PDHMS surface units to cause the PDHMS surface units to store recovery data during the downstream communication link failure, and to detect an existence of a communication failure in a RTU-PDHMS surface unit communication link between one of the plurality of PDHMS surface units and the RTU when so occurring defining a RTU-PDHMS surface unit communication link failure, to determine a time of failure of the RTU-PDHMS surface unit communication link, to report the RTU-PDHMS surface unit communication link failure, and to determine a time of restoration of the failed RTU-PDHMS surface unit communication link defining a RTU-PDHMS surface unit communication link restoration;

a network interface; and a supervisory control and data acquisition (SCADA) system comprising a SCADA host server in communication with the broadband interface of each of the plurality of PDHMS surface units and in communication with the RTU via the network interface and including a controller configured to monitor communications between each of the PDHMS surface units and associated RTU and between the RTU and the SCADA system to define a plurality of upstream communication links, to determine an existence of a communication failure in one of the upstream communication links when so occurring, to determine a time of failure of the failed upstream communication link, to determine a time of restoration of the failed upstream communication link responsive to restoration of communications over the failed upstream communication link, and upon restoration of communications over the failed upstream communication link, to capture real-time process data comprising the process data captured real-time by each of the plurality of the PDHMS surface units and to retrieve process data relating to the recovery data previously captured and stored by one or more of the PDHMS surface units and not delivered due to the communication failure of the respective failed upstream communication link.

2. An apparatus as defined in claim 1, wherein the controller of each PDHMS surface unit includes a processor, memory coupled to the processor, and program product stored in the memory and including instructions that when executed by the processor, cause the PDHMS surface unit to perform the operations of:

receiving real-time process data comprising real-time pressure and temperature from a plurality of associated downhole sensors according to a preselected interval;

storing the received process data in the one or more recovery files during a downstream communication link failure downstream of the PDHMS surface unit; and responsive to downstream communication link reestablishment, providing substantially simultaneously both the continuous real-time data stream of captured data over the serial interface and at least portions of the stored process data in the one or more recovery files over the broadband interface to thereby non-disruptively provide recovery file transmission of recovery data stored during the downstream communication link failure.

3. An apparatus as defined in claim 1, wherein the broadband interface of each PDHMS surface unit comprises an Ethernet interface;

wherein the serial interface of each PDHMS surface unit comprises one or more of the following: an RS-232 serial interface and an RS485 serial interface;

wherein each PDIIMS surface unit is positioned in communication with the respective plurality of the separate and spaced apart downhole sensors each providing temperature, pressure, or temperature and pressure process data;

wherein each PDHMS surface unit is configured to iteratively continuously collect the pressure and temperature from each of the plurality downhole sensors substantially simultaneously at a rate of approximately one sample per second to thereby form the captured downhole process data points;

wherein the controller of each PDHMS surface unit is configured to cause the respective PDHMS surface unit to timestamp each downhole process data point upon collecting the respective internal temperature and pressure data; and wherein each PDHMS surface unit is configured to support FTP function to enable file transfer of recovery data to one or more of the following: the RTU, the SCADA host server, and an intermediate host server in communication SCADA host server.

4. An apparatus as defined in claim 1, wherein each of the plurality of PDHMS surface units and the RTU separately include an internal clock;

wherein the SCADA system is configured to function as a time synchronization master to each of the plurality of the PDHMS surface units and the RTU; and wherein each PDHMS surface unit and the RTU are each separately configured to receive a time synchronization signal from the SCADA system to update its respective internal clock.

5. An apparatus as defined in claim 1, wherein the controller of each PDHMS surface unit is further configured to store the respective recovery data for the respective PDHMS surface unit in the one or more recovery files according to the following convention:

each recovery file is separately assigned to a specific year, month, and day, different than that of each other recovery file and contains a PDHMS surface unit unique identification for the respective PDHMS surface unit and up to approximately 86,000 captured process data points, each captured process data point is separately associated with a year, month, day, hour, minute, and second indicating when the respective process data was captured from the respective plurality of downhole sensors, each captured process data point includes the plurality of pressure and temperature pairs and a corresponding timestamp indicating the hour, minute, and second, individual data elements of each captured data point provided in text format with delimitation using one or more of the following: commas and tabs, each captured data point is stored at approximately one second intervals in the recovery file having a matching associated year, month, and day, and recovery data including a plurality of captured process data points extending over a plurality of different days is distributed across a corresponding plurality of different recovery files according to the respective timestamp of each separate one of the plurality of captured process data points; and wherein the controller of each PDHMS surface unit is further configured to provide file deletion housekeeping based on the following convention: a first recovery file created is the first recovery file to be deleted once overall storage capacity of the nonvolatile data storage medium reaches eighty percent of total storage capacity; and wherein each PDHMS surface unit is further configured to allow copy access during recovery file update with additional captured process data points by the respective PDHMS surface unit and without a file access violation during copy access by one or more of the following: the RTU, the SCADA host server, and an intermediate host server in communication SCADA host server.

6. An apparatus as defined in claim 1,
wherein each PDHMS surface unit is configured to function as a file transfer protocol (FTP) server, wherein the RTU is configured to function as an FTP client, and wherein the RTU controller includes a processor, memory coupled to the processor, and program product stored in the memory and including instructions that when executed by the RTU processor, cause the RTU to perform the operations of:
  logging the time and date when the RTU-PDHMS surface unit communication link failure occurred and the time and date when the failed RTU-PDHMS surface unit communication link was restored, and
  for each of the plurality of PDHMS surface units, determining which of the one or more recovery files contain recovery data captured between a time continuum extending between the time of failure of the RTU-PDHMS surface unit communication link and the time of restoration of the RTU-PDHMS surface unit communication link, to thereby determine which of the one or more recovery files are to be accessed and retrieved from the respective PDHMS surface unit; and
wherein the SCADA host server includes a processor, memory coupled to the processor, and program product stored in the memory and including instructions that when executed by the processor, cause the SCADA host server to perform the operations of:
  issuing an FTP command to copy a recovery file including recovery data relating to the data previously captured by one or more of the plurality of PDHMS surface units and not delivered due to the upstream communication failure, the recovery file selected for copy responsive to the RTU or SCADA host server determining the recovery file to contain one or more captured downhole process data points having a timestamp falling within a time continuum extending between the time of failure of the RTU-PDHMS surface unit communication link and the time of restoration of the failed RTU-PDHMS surface unit communication link, and
  extracting process data and timestamp data from the copied recovery file, the process data beginning at the time of failure of the RTU-PDHMS surface unit communication link and ending at the time of restoration of the failed RTU-PDHMS surface unit communication link.

7. An apparatus as defined in claim 1, wherein each PDHMS surface unit is configured to function as a file transfer protocol (FTP) server, wherein the RTU is configured to function as an FTP client, and wherein the RTU controller includes a processor, memory coupled to the processor, and program product stored in the memory and including instructions that when executed by the RTU processor, cause the RTU to perform the operations of:
  monitoring a health status of a plurality of RTU-PDHMS surface unit communication links, each RTU-PDHMS surface unit communication link providing a communication pathway between the RTU and a separate one of the plurality of PDHMS surface units;
  detecting a failure of one of the plurality of RTU-PDIIMS surface unit communication links when occurring;
  logging a time and date when the failure of the one of the plurality of RTU-PDHMS surface unit communication links occurred;
  reporting the failure of the one of the plurality of RTU-PDHMS surface unit communication links when occurring to the SCADA host server;
  detecting a restoration of the failed one of the plurality of RTU-PDHMS surface unit communication links when occurring;
  logging a time and date when the restoration of the failed one of the plurality of RTU-PDHMS surface unit communication links occurred;
  identifying which of one or more recovery files of a plurality of recovery files, stored in the nonvolatile PDHMS surface unit storage medium of the PDHMS surface unit associated with the failed one of the plurality of RTU-PDHMS surface unit communication links, contain captured downhole process data points captured and stored during the failure of the one of the plurality of RTU-PDHMS surface unit communication links and not delivered to the RTU due to the failure thereof, the one or more recovery files identified by the RTU responsive to the RTU determining the one or more recovery files to contain one or more captured downhole process data points having a timestamp falling within a time continuum extending between the time of failure of the one of the plurality of RTU-PDHMS surface unit communications links and the time of restoration thereof;
  issuing an FTP command to copy the one or more recovery files containing the recovery data previously captured by the respective PDHMS surface unit associated with the failed RTU-PDHMS surface unit communication link and not delivered due to the failure thereof; and
  extracting process data and timestamp data from the copied one or more recovery files, the process data beginning at the time of failure of the one of the plurality of RTU-PDHMS surface unit communication links and ending at the time of restoration thereof.

8. An apparatus as defined in claim 1, wherein the SCADA host server includes a processor, memory coupled to the processor, and program product stored in the memory and including instructions that when executed by the processor, cause the SCADA host server to perform the operations of:
  responsive to restoration of the failed upstream communication link, initiating copying of each of one or more recovery files each separately containing at least a portion of the recovery data previously captured and stored by one of the PDHMS surface units associated with the failed upstream communication link and not delivered due to failure thereof defining recovered data;
  refetching the recovered data into a SCADA historian; and
  creating a single new file comprising the recovered data for transfer over a downstream communication link downstream of the SCADA host server, the new file comprising process data and timestamp data from the copied one or more recovery files, the process data beginning at the time when the upstream communication failure occurred and ending at the time when the upstream communication restoration occurred.

9. An apparatus as defined in claim 1, wherein each PDHMS surface unit is configured to function as a file transfer protocol (FTP) server, wherein the SCADA host server is configured to function as an FTP client, wherein the SCADA controller includes a processor, memory coupled to the processor, and program product stored in the memory and including instructions that when executed by the SCADA processor, cause the SCADA host server to perform the operations of:

monitoring a health status of a plurality of SCADA-PDHMS surface unit communication links, each SCADA-PDHMS surface unit communication link providing a communication pathway between the SCADA host server and a separate one of the plurality of PDHMS surface units;

detecting a failure of one of the plurality of SCADA-PDHMS surface unit communication links when occurring;

logging a time and date when the failure of the one of the plurality of SCADA-PDHMS surface unit communication links occurred;

detecting a restoration of the failed one of the plurality of SCADA-PDHMS surface unit communication links when occurring;

logging a time and date when the restoration of the failed one of the plurality of SCADA-PDHMS surface unit communication links occurred;

identifying which of one or more recovery files of a plurality of recovery files stored in the nonvolatile PDHMS surface unit storage medium of the PDHMS surface unit associated with the failed one of the plurality of SCADA-PDIIMS surface unit communication links contain captured downhole process data points captured and stored during the failure of the one of the plurality of SCADA-PDHMS surface unit communication links and not delivered to the SCADA host server due to the failure thereof, the one or more recovery files identified by the SCADA host server responsive to determining the one or more recovery files to contain one or more captured downhole process data points having a timestamp falling within the time continuum extending between the time of failure of the one of the plurality of SCADA-PDHMS surface unit communications links failure and the time of restoration thereof;

issuing an FTP command to copy the one or more recovery files containing the recovery data previously captured by the respective PDHMS surface unit associated with the failed SCADA-PDHMS surface unit communication link and not delivered due to the failure thereof;

extracting process data and timestamp data from the copied one or more recovery files, the process data beginning at the time of failure of the one of the plurality of SCADA-PDHMS surface unit communication links and ending at the time restoration thereof defining recovered data; and creating a single new file comprising the recovered data for transfer over a downstream communication link downstream of the SCADA host server, the new file comprising the process data and timestamp data from the copied one or more restoration files, the process data beginning at the time of failure of the one of the plurality of SCADA-PDHMS surface unit communication links and ending at the time restoration thereof.

10. An apparatus as defined in claim 1, wherein the RTU is configured to poll each PDHMS surface unit, and to continuously collect each captured downhole process data point at a rate of approximately one sample per second from each associated PDHMS surface unit;

wherein the RTU is further configured to provide indicia of the captured downhole process data as report by exception with the following deadband:
pressure approximately ±0.01 psi, and
temperature approximately ±0.1 degrees;

wherein the SCADA host server is configured to poll the RTU, to collect data from the RTU representing the captured pressure and temperature data captured by each PDHMS surface unit and reported by exception when an exception exists at a rate of approximately one sample per second to reduce bandwidth requirements between the RTU and the SCADA host server, and to continuously collect the captured pressure and temperature data captured by each PDHMS surface unit at a rate of approximately one sample per minute to ensure data quality is enforced;

wherein the SCADA host server is in communication with a SCADA database to store collected data; and wherein the SCADA database is configured as a report by exception with the following deadband:
pressure approximately ±0.01 psi, and
temperature approximately ±0.1 degrees.

11. An apparatus to manage post-drilling operation data acquisition, the apparatus comprising:

a permanent downhole monitoring system (PDHMS) surface unit having:
a serial interface and a broadband interface to selectively provide a continuous real-time data stream of downhole process data including a plurality of captured downhole process data points each comprising a plurality of real-time pressure and temperature pairs captured substantially simultaneously via a plurality of separate and spaced apart downhole sensors and to provide for recovery file transmission of recovery data stored in one or more recovery files during a downstream communication failure downstream of the PDHMS surface unit,
a first data storage medium to temporarily store each captured data point,
a second data storage medium to store each captured data point collected during the downstream communication failure located downstream of the PDHMS surface unit defining recovery data, and
a controller configured to detect the downstream communication failure when occurring and to cause the respective PDHMS surface unit to store the recovery data in the second data storage medium in one or more recovery files during the downstream communication failure downstream of the PDHMS surface unit; and a receiver transmitter unit (RTU) in communication with the serial interface of the PDHMS surface unit and including a controller configured to collect the continuous real-time data collected by the PDHMS surface unit, configured to detect an existence of a communication failure between the PDHMS surface unit and the RTU when so occurring defining a RTU-PDHMS surface unit communication failure, and configured to detect a downstream communication failure downstream of the RTU.

12. An apparatus as defined in claim 11, wherein the controller of the PDHMS surface unit includes a processor, memory coupled to the processor, and program product stored in the memory and including instructions that when executed by the processor, cause the PDHMS surface unit to perform the operations of:

receiving real-time process data comprising real-time pressure and temperature from a plurality of associated downhole sensors according to a preselected interval;

storing the received process data in the one or more recovery files during the downstream communication failure downstream of the PDHMS surface unit; and responsive to downstream communication reestablishment, providing substantially simultaneously both the continuous real-time data stream of captured data over the serial interface and at least portions of the stored process data in the one or more recovery files over the broadband interface to thereby non-disruptively provide recovery file transmission of recovery data stored during die downstream communication failure downstream of the PDHMS surface unit.

13. An apparatus as defined in claim 11,
wherein the controller of the PDHMS surface unit is further configured to store the respective recovery data for the PDHMS surface unit in the one or more recovery files according to the following convention:
  each recovery file is separately assigned to a specific year, month, and day, different from that of each other recovery file and contains a PDHMS surface unit unique identification for the PDHMS surface unit and up to approximately 86,000 captured process data points,
  each captured process data point is associated with a year, month, day, hour, minute, and second indicating when the respective process data was captured from the respective plurality of downhole sensors,
  each captured process data point includes the plurality of pressure and temperature pairs and a corresponding timestamp indicating the hour, minute, and second, individual data elements of each captured data point provided in text format with delimitation using one or more of the following: commas and tabs,
  each captured data point is stored at approximately one second intervals in the recovery file having a matching associated year, month, and day, and
  recovery data including a plurality of captured process data points extending over a plurality of different days is distributed across a corresponding plurality of different recovery files according to the respective timestamp of each separate one of the plurality of captured process data points; and
wherein the controller of the PDHMS surface unit is further configured to provide file deletion house keeping based on the following convention: a first recovery file created is the first recovery file to be deleted once overall storage capacity of the second data storage medium reaches eighty percent of total storage capacity.

14. An apparatus as defined in claim 11, wherein the PDHMS surface unit is further configured to allow copy access during recovery file update with additional captured process data points by the PDHMS surface unit and without a file access violation during copy access by one or more of the following: the RTU, a SCADA host server, and an intermediate host server in communication SCADA host server.

15. An apparatus as defined in claim 11, wherein the RTU is further configured to communicate with the PDHMS surface unit to cause the PDHMS surface unit to store recovery data during the downstream communication failure downstream of the RTU.

16. An apparatus as defined in claim 11, wherein the PDHMS surface unit is configured to function as a file transfer protocol (FTP) server, wherein the RTU is configured to function as an FTP client, and wherein the RTU controller includes a processor, memory coupled to the processor, and program product stored in the memory and including instructions that when executed by the RTU processor, cause the RTU to perform the operations of:
  monitoring a health status of a RTU-PDHMS surface unit communication link, the RTU-PDHMS surface unit communication link providing a communication pathway between the RTU and the PDHMS surface unit;
  detecting a failure of the RTU-PDHMS surface unit communication link when occurring;
  determining a time and date when the failure of the RTU-PDHMS surface unit communication link occurred;
  reporting the failure of the RTU-PDHMS surface unit communication link when occurring to a SCADA host server;
  detecting a restoration of the failed RTU-PDHMS surface unit communication link when occurring;
  determining a time and date when the restoration of the failed RTU-PDHMS surface unit communication link occurred;
  identifying which of one or more recovery files of a plurality of recovery files, stored in the second data storage medium of the PDHMS surface unit contain captured downhole process data points captured and stored during the failure of the RTU-PDHMS surface unit communication link and not delivered to the RTU due to the failure thereof, the one or more recovery files identified by the RTU responsive to the RTU determining the one or more recovery files to contain one or more captured downhole process data points having a timestamp falling within a time continuum extending between the time of failure of the RTU-PDHMS surface unit communication link and the time of restoration thereof;
  issuing an FTP command to copy the one or more recovery files containing the recovery data previously captured by the respective PDHMS surface unit associated with the failed RTU-PDHMS surface unit communication link and not delivered due to the failure thereof; and
  extracting process data and timestamp data from the copied one or more recovery files, the process data beginning at the time of failure of the RTU-PDHMS surface unit communication link and ending at the time of restoration thereof.

17. An apparatus as defined in claim 11,
wherein the RTU is configured to poll each PDIIMS surface unit and to continuously collect each captured downhole process data point at a rate of approximately one sample per second from each associated PDHMS surface unit; and
wherein the RTU is configured to provide indicia of the captured downhole process data as report by exception with the following deadband:
  pressure approximately ±0.01 psi, and
  temperature approximately ±0.1 degrees.

18. An apparatus as defined in claim 11,
wherein the PDHMS surface unit and the RTU each include an internal clock;
wherein the apparatus further comprises a supervisory control and data acquisition (SCADA) system comprising a SCADA host server configured to function as a time synchronization master to the PDHMS surface unit and the RTU; and
wherein the PDHMS surface unit and the RTU are each separately configured to receive a time synchronization signal from the SCADA system to update its respective internal clock.

19. An apparatus as defined in claim 1 further comprising:
a network interface including an Ethernet switch; and
a SCADA system including a SCADA host server in communication with the broadband interface of the PDHMS surface unit and in communication with the RTU via the network interface and having a processor, memory coupled to the processor, and program product stored in the memory and including instructions that when executed by the processor, cause the SCADA host server to perform the operations of:
- monitoring communications between the PDHMS surface unit and RTU and between the RTU and the SCADA system to define a plurality of upstream communication links,
- determining an existence of a communication failure in one of the upstream communication links when so occurring,
- determining a time of failure of the failed upstream communication link, and
- responsive to restoration of communications over the failed upstream communication link:
  - determining a time of restoration of the failed upstream communication link,
  - capturing real-time process data comprising the process data captured real-time by the PDHMS surface unit,
  - initiating copying of each of one or more recovery files each containing at least a portion of the recovery data previously captured and stored by one of the PDHMS surface unit and not delivered due to loss of communications over the failed upstream communication link defining recovered data,
  - refetching the recovered data into a SCADA historian, and
  - creating a single new file comprising the recovered data for transfer over a downstream communication link downstream of the SCADA host server, the new file comprising process data and timestamp data from the copied one or more recovery files, the process data beginning at the time when the upstream communication failure occurred and ending at the time when the upstream communication restoration occurred.

20. An apparatus as defined in claim 11, further comprising a SCADA system including a SCADA host server configured:
- to poll the RTU to collect data from the RTU representing the captured pressure and temperature data captured by the PDHMS surface unit and reported by exception when an exception exists at a first predetermined rate to thereby reduce bandwidth requirements between the RTU and the SCADA host server, and
- to continuously collect the captured pressure and temperature data captured by the PDHMS surface unit, at a second predetermined rate to thereby ensure data quality is enforced.

21. An apparatus as defined in claim 20,
wherein the first predetermined rate comprises a rate of approximately one sample per second; and
wherein the second predetermined rate comprises at a rate of approximately one sample per minute.

22. An apparatus as defined in claim 20,
wherein the SCADA system includes a SCADA database to store collected data;
wherein the SCADA host server is positioned in communication with the SCADA database to store the collected data; and
wherein the SCADA database is configured as a report by exception with the following deadband:
pressure approximately ±0.01 psi, and
temperature approximately ±0.1 degrees.

23. A method of managing post-drilling operation data acquisition, the method comprising the steps of:
providing an apparatus to manage post-drilling operation data acquisition comprising a permanent downhole monitoring system (PDHMS) surface unit including a serial interface and a broadband interface, an associated receiver transmitter unit (RTU) in communication with the serial interface of the PDHMS surface unit, a network interface comprising an Ethernet switch, and a supervisory control and data acquisition (SCADA) system host server in communication with the broadband interface of the PDHMS surface unit and the RTU via the network interface;
receiving by the PDHMS surface unit, a substantially continuous stream of real-time process data including real-time pressure and temperature from a plurality of separate and spaced apart downhole pressure sensors associated therewith according to a preselected interval;
responsive to receiving the real-time process data, providing a continuous real-time data stream of captured downhole process data including a plurality of captured downhole process data points each comprising a plurality of real-time pressure and temperature pairs captured substantially simultaneously via the plurality of separate and spaced apart downhole sensors;
detecting a downstream communication failure, when occurring, between one or more of the following: the PDHMS surface unit and the associated RTU, and the RTU and the SCADA system host server, individually and collectively defining a downstream communication pathway failure located downstream of the PDHMS surface unit when occurring;
responsive to the downstream communication pathway failure located downstream of the PDHMS surface unit, the PDHMS surface unit storing the received real-time process data in one or more recovery files to define recovery data; and
responsive to downstream communication pathway reestablishment, the PDHMS surface unit substantially simultaneously providing both the continuous real-time data stream of captured data over the serial interface and at least portions of the recovery data stored in the one or more recovery files over the broadband interface to thereby non-disruptively provide recovery file communication of the recovery data stored during the downstream communication pathway failure downstream of the PDHMS surface unit.

24. A method as defined in claim 23, further comprising the steps of:
the PDHMS surface unit assigning each recovery file to a distinct year, month, and day, different than that of each other recovery file and each recovery file a PDHMS surface unit unique identification for the PDHMS surface unit distinct from any other PDHMS surface units in communication with the RTU;
the PDHMS surface unit associating each captured process data point with a year, month, day, hour, minute, and second indicating when the respective process data associated therewith was captured from the plurality of downhole sensors, each captured process data point including the plurality of pressure and temperature pairs and a corresponding timestamp indicating the hour, minute, and second, individual data elements of each captured data point provided in text format with delimitation using one or more of the following: commas and tabs; and
the PDHMS surface unit storing each captured data point at approximately one second intervals in the respective recovery file having a matching associated year, month, and day.

25. A method as defined in claim 24, wherein the PDHMS surface unit comprises a nonvolatile storage medium configured to store each of the one or more recovery files, the method further comprising the step of:

the PDHMS surface unit providing file deletion house keeping based on the following convention: a first recovery file created is the first recovery file to be deleted once overall storage capacity of the nonvolatile data storage medium reaches eighty percent of total storage capacity.

26. A method as defined in claim 24, further comprising the step of:

the PDHMS surface unit providing copy access to one of the one or more recovery files when simultaneously performing recovery file update thereof with additional captured process data points without a file access violation during copy access by one or more of the following: the RTU, the SCADA host server, and an intermediate host server in communication SCADA host server to thereby prevent disruption of the simultaneous provision of the continuous real-time data stream of captured data.

27. A method as defined in claim 23, further comprising the step of:

issuing a file transfer protocol (FTP) command to the PDHMS surface unit to copy the one or more recovery files and transfer the one or more recovery files to the SCADA host server to thereby provide for recovery of the recovery data stored in one or more recovery files during the RTU-SCADA communication failure, the step of issuing a file transfer protocol command performed by one of the following: the RTU, the SCADA host server, and an intermediate host server in communication SCADA host server.

28. A method as defined in claim 27, wherein the continuous real-time data stream of captured downhole process data is collected via the serial interface of the PDHMS surface unit and the copied one or more recovery files are transferred via the broadband interface of the PDHMS surface unit through the Ethernet switch to thereby non-disruptively provide recovery file recovery of the recovery data stored during the downstream communication pathway failure downstream of the PDHMS surface unit.

29. A method as defined in claim 23, further comprising the steps of:

collecting by the RTU the continuous real-time data stream of captured downhole process data provided by the PDHMS surface unit when no substantial communication failure exists between the RTU and the SCADA host server defining a RTU-SCADA communication failure;

detecting by the RTU an existence of the RTU-SCADA communication failure when occurring;

responsive to detecting the existence of the RTU-SCADA communication failure, the RTU communicating with the PDHMS surface unit to cause the PDHMS surface unit to begin storing the recovery data in the one or more recovery files in a nonvolatile PDHM storage medium during the RTU-SCADA communication failure; and responsive to RTU-SCADA communication reestablishment, the RTU resuming collection of the continuous real-time data stream of captured downhole process data from the PDHMS surface unit.

30. A method as defined in claim 29, further comprising the step of:

the RTU issuing a file transfer protocol command to the PDHMS surface unit to copy the one or more recovery files and transfer the one or more recovery files to the SCADA host server to thereby provide for recovery of the recovery data stored in one or more recovery files during the RTU-SCADA communication failure.

31. A method as defined in claim 30, wherein the continuous real-time data stream of captured downhole process data is collected via the serial interface of the PDHMS surface unit and the copied one or more recovery files are collected via the broadband interface of the PDHMS surface unit through the Ethernet switch to thereby non-disruptively provide recovery file recovery of the recovery data stored during the downstream communication pathway failure downstream of the PDHMS surface unit.

32. A method as defined in claim 29, wherein the RTU is configured to provide indicia of the captured downhole process data as a report by exception with the following deadband: pressure approximately ±0.01 psi, and temperature approximately ±0.1 degrees, the method further comprising the following step performed by the RTU:

analyzing the collected continuous real-time data stream of captured downhole process data provided by the PDIIMS surface unit; and sending the collected captured downhole process data to the SCADA system host server according to the RTU deadband configuration responsive to the data analysis to thereby reduce RTU-SCADA bandwidth requirements.

33. A method as defined in claim 23, further comprising the steps of:

monitoring a health status of a RTU-PDHMS surface unit communication pathway, the RTU-PDHMS surface unit communication pathway providing a communication pathway between the RTU and the PDHMS surface unit;

detecting a failure of the RTU-PDHMS surface unit communication pathway when occurring;

determining a time and date when the failure of the one of the RTU-PDHMS surface unit communication pathway occurred;

reporting the failure of the RTU-PDHMS surface unit communication pathway when occurring to the SCADA host server;

detecting a restoration of the failed RTU-PDHMS surface unit communication pathway when occurring;

determining a time and date when the restoration of the failed RTU-PDHMS surface unit communication pathway occurred;

identifying which of one or more recovery files of a plurality of recovery files stored by the PDHMS surface unit contain captured downhole process data points captured and stored during the failure of the RTU-PDHMS surface unit communication pathway and not delivered to the RTU due to the failure thereof, the one or more recovery files identified by the RTU responsive to the RTU determining the one or more recovery files to contain one or more captured downhole process data points having a timestamp falling within a time continuum extending between the time of failure of the RTU-PDHMS surface unit communication pathway and the time of restoration thereof;

issuing an FTP command to copy the one or more recovery files containing the recovery data previously captured by the respective PDHMS surface unit associated with the failed RTU-PDHMS surface unit communication pathway and not delivered due to the failure thereof; and extracting process data and timestamp data from the copied one or more recovery files, the extracted process data beginning at the time of failure of the RTU-PDIIMS surface unit communication pathway and ending at the time of restoration thereof.

34. A method as defined in claim 33,
wherein the step of identifying which of the one or more recovery files contain captured downhole process data points captured and stored during the failure of the RTU-PDHMS surface unit communication pathway and not delivered to the RTU due to the failure thereof is performed by the RTU; and
wherein the steps of issuing an FTP command to copy the one or more recovery files and extracting process data and timestamp data from the copied one or more recovery files are performed by the SCADA host server.

35. A method as defined in claim 23, further comprising the steps of:
monitoring communications between the PDHMS surface unit and RTU and between the RTU and the SCADA system to define a plurality of upstream communication pathways;
determining by the SCADA host server an existence of a communication failure in one of the plurality of upstream communication pathways when so occurring defining a failed upstream communication pathway;
determining a time of failure of the failed upstream communication pathway; and
responsive to restoration of communications over the failed upstream communication pathway:
determining a time of restoration of the failed upstream communication pathway,
initiating copying of each of one or more recovery files each containing at least a portion of the recovery data previously captured and stored by one of the PDHMS surface unit and not delivered due to loss of communications over the failed upstream communication pathway defining recovered data,
refetching the recovered data into a SCADA historian, and
creating a single new file comprising the recovered data for transfer over a downstream communication pathway downstream of the SCADA host server, the new file comprising process data and timestamp data from the copied one or more recovery files, the process data beginning at the time when the upstream communication failure occurred and ending at the time when the upstream communication restoration occurred.

36. A method as defined in claim 35, further comprising the step of:
the SCADA host server issuing a file transfer protocol command to the PDHMS surface unit to copy the one or more recovery files and transfer the one or more recovery files to the SCADA host server to thereby provide for recovery of the recovery data stored in one or more recovery files during the RTU-SCADA communication failure.

37. A method as defined in claim 23, further comprising the step of polling the RTU to collect data from the RTU representing the captured pressure and temperature data captured by the PDHMS surface unit, the data received from the RTU being:
reported to the SCADA host server by exception when an exception exists at the first predetermined rate to thereby reduce bandwidth requirements between the RTU and the SCADA host server; and
reported to the SCADA host server as actual downhole process data point and timestamp data at a second predetermined rate irrespective of report by exception deadband to thereby ensure data quality is enforced, the second predetermined rate being substantially larger than the first predetermined rate.

38. A method as defined in claim 37,
wherein the first predetermined rate comprises a rate of approximately one sample per second; and
wherein the second predetermined rate comprises at a rate of approximately one sample per minute.

39. A method as defined in claim 37, wherein the SCADA host server includes a SCADA database to store collected data, wherein the SCADA database is configured as a report by exception with the following deadband: pressure approximately ±0.01 psi, and temperature approximately ±0.1 degrees, the method further comprising the following steps performed by the SCADA host server:
analyzing the received actual downhole process data point and timestamp data provided by the RTU; and
storing the received actual downhole process data point and timestamp data according to the SCADA database deadband configuration responsive to the data analysis to thereby reduce SCADA system storage requirements.

40. A method as defined in claim 23,
wherein the PDHMS surface unit and the RTU each include an internal clock;
wherein the SCADA host server is configured to function as a time synchronization master to the PDHMS surface unit and the RTU;
wherein the PDHMS surface unit and the RTU are each separately configured to receive a time synchronization signal from the SCADA system to update its respective internal clock; and
wherein the method further comprises the step of synchronizing the PDHMS surface unit, RTU, and SCADA host server according to a same timing source, by performing one or more of the following:
sending a timestamp message according to a GPS-timing server utilizing a simple network transfer protocol (SNTP), and
sending a timestamp message according to a serial modbus over IP communication protocol, the timestamp portion comprising six consecutive registers containing year, month, day, hour, minute, and second.

* * * * *

UNITED STATES PATENT AND TRADEMARK OFFICE
CERTIFICATE OF CORRECTION

PATENT NO. : 8,312,320 B2  
APPLICATION NO. : 12/547295  
DATED : November 13, 2012  
INVENTOR(S) : Soloman M. Almadi et al.

Page 1 of 1

It is certified that error appears in the above-identified patent and that said Letters Patent is hereby corrected as shown below:

In claim 3, column 19, line 66, please delete the word "PDIIMS" and insert the word --PDHMS--

In claim 7, column 22, line 1, please delete the word "PIIMS" and insert the word --PDHMS--

In claim 9, column 23, line 26, please delete the word "PDIIMS" and insert the word --PDHMS--

In claim 12, column 25, line 6, please delete the word "die" and insert the word --the--

In claim 17, column 26, line 37, please delete the word "PDIIMS" and insert the word --PDHMS--

In claim 32, column 30, lines 21-22, please delete the word "PDI-IMS" and insert the word --PDHMS--

In claim 33, column 31, line 1, please delete the word "PDIIMS" and insert the word --PDHMS--

Signed and Sealed this  
Fifth Day of February, 2013

Teresa Stanek Rea  
*Acting Director of the United States Patent and Trademark Office*